United States Patent
Fok et al.

(10) Patent No.: US 8,606,299 B2
(45) Date of Patent: Dec. 10, 2013

(54) APPARATUS AND METHODS FOR GEOGRAPHIC POSITION APPROXIMATION OF AN EVENT OCCURRING ON A WIRELESS DEVICE

(75) Inventors: Kenny Fok, San Diego, CA (US); Eric Chi Chung Yip, San Diego, CA (US); Mikhail A. Lushin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1574 days.

(21) Appl. No.: 11/477,892

(22) Filed: Jun. 28, 2006

(65) Prior Publication Data

US 2007/0161380 A1    Jul. 12, 2007

Related U.S. Application Data

(60) Provisional application No. 60/757,743, filed on Jan. 9, 2006.

(51) Int. Cl.
*H04W 24/00* (2009.01)

(52) U.S. Cl.
USPC .................. 455/456.3; 455/456.1; 455/456.2; 455/550

(58) Field of Classification Search
USPC ........... 455/456.3, 456.1, 404.2, 550.1, 456.2
See application file for complete search history.

(56) References Cited

U.S. PATENT DOCUMENTS

| | | | |
|---|---|---|---|
| 5,392,052 A | 2/1995 | Eberwine | |
| 7,006,827 B2* | 2/2006 | Masuda et al. | 455/439 |
| 7,206,573 B1* | 4/2007 | Weaver et al. | 455/423 |
| 7,266,376 B2* | 9/2007 | Nakagawa | 455/456.1 |
| 7,400,884 B2 | 7/2008 | Fok et al. | |
| 2002/0037750 A1* | 3/2002 | Hussain et al. | 455/564 |
| 2002/0042268 A1 | 4/2002 | Cotanis | |
| 2002/0068583 A1* | 6/2002 | Murray | 455/456 |
| 2004/0002814 A1 | 1/2004 | Gogic | |
| 2004/0073364 A1 | 4/2004 | Jung | |
| 2004/0110515 A1* | 6/2004 | Blumberg et al. | 455/456.1 |
| 2004/0142678 A1* | 7/2004 | Krasner | 455/404.2 |

(Continued)

FOREIGN PATENT DOCUMENTS

| | | |
|---|---|---|
| CN | 1486576 | 3/2004 |
| GB | 2362231 | 11/2001 |
| JP | 63171377 A | 7/1988 |
| JP | 1270611 A | 10/1989 |
| JP | 8313278 A | 11/1996 |

(Continued)

OTHER PUBLICATIONS

International Search Report and Written Opinion—PCT/US2007/060286, International Search Authority—European Patent Office Jun. 27, 2007.

*Primary Examiner* — Ajit Patel
*Assistant Examiner* — Julio Perez
(74) *Attorney, Agent, or Firm* — Arnold J. Gum

(57) ABSTRACT

Apparatus and methods may approximate a location of an event occurring on a wireless device based upon at least one of a first set of location fix information corresponding to a first set of location fix information corresponding to a first position fix of the wireless device prior to the event and a second set of location fix information corresponding to a second position fix of the wireless device after the event. An event positioning determination module may calculate an approximate geographic location of the wireless device at the time of the event based upon a predetermined relationship between the event and at least one of the first and second set of location fix information.

35 Claims, 18 Drawing Sheets

(56) References Cited

U.S. PATENT DOCUMENTS

| | | |
|---|---|---|
| 2004/0152362 A1 | 8/2004 | Carter |
| 2004/0176107 A1 | 9/2004 | Chadha |
| 2004/0198398 A1 | 10/2004 | Amir et al. |
| 2004/0203607 A1* | 10/2004 | Satapathy ............... 455/412.1 |
| 2004/0203644 A1* | 10/2004 | Anders et al. ........... 455/414.1 |
| 2005/0054339 A1* | 3/2005 | Merritt ...................... 455/423 |
| 2005/0136942 A1 | 6/2005 | Timiri et al. |
| 2006/0229087 A1* | 10/2006 | Davis et al. ............. 455/456.1 |
| 2006/0270400 A1* | 11/2006 | DaSilva et al. ............ 455/423 |
| 2006/0276168 A1* | 12/2006 | Fuller et al. ............. 455/456.1 |
| 2007/0060108 A1* | 3/2007 | East et al. .............. 455/414.1 |
| 2007/0111748 A1* | 5/2007 | Risbood ................. 455/550.1 |
| 2007/0149208 A1* | 6/2007 | Syrbe et al. ............ 455/456.1 |

FOREIGN PATENT DOCUMENTS

| | | |
|---|---|---|
| JP | 2001051040 A | 2/2001 |
| JP | 2001208822 A | 8/2001 |
| JP | 2003517753 T | 5/2003 |
| JP | 2004048490 A | 2/2004 |
| JP | 2004085222 A | 3/2004 |
| JP | 2005221374 A | 8/2005 |
| JP | 2005308410 A | 11/2005 |
| JP | 2005337791 A | 12/2005 |
| JP | 2006516869 T | 7/2006 |
| JP | 2007040784 A | 2/2007 |
| JP | 2012010365 | 1/2012 |
| WO | 2006116618 A1 | 11/2006 |

* cited by examiner

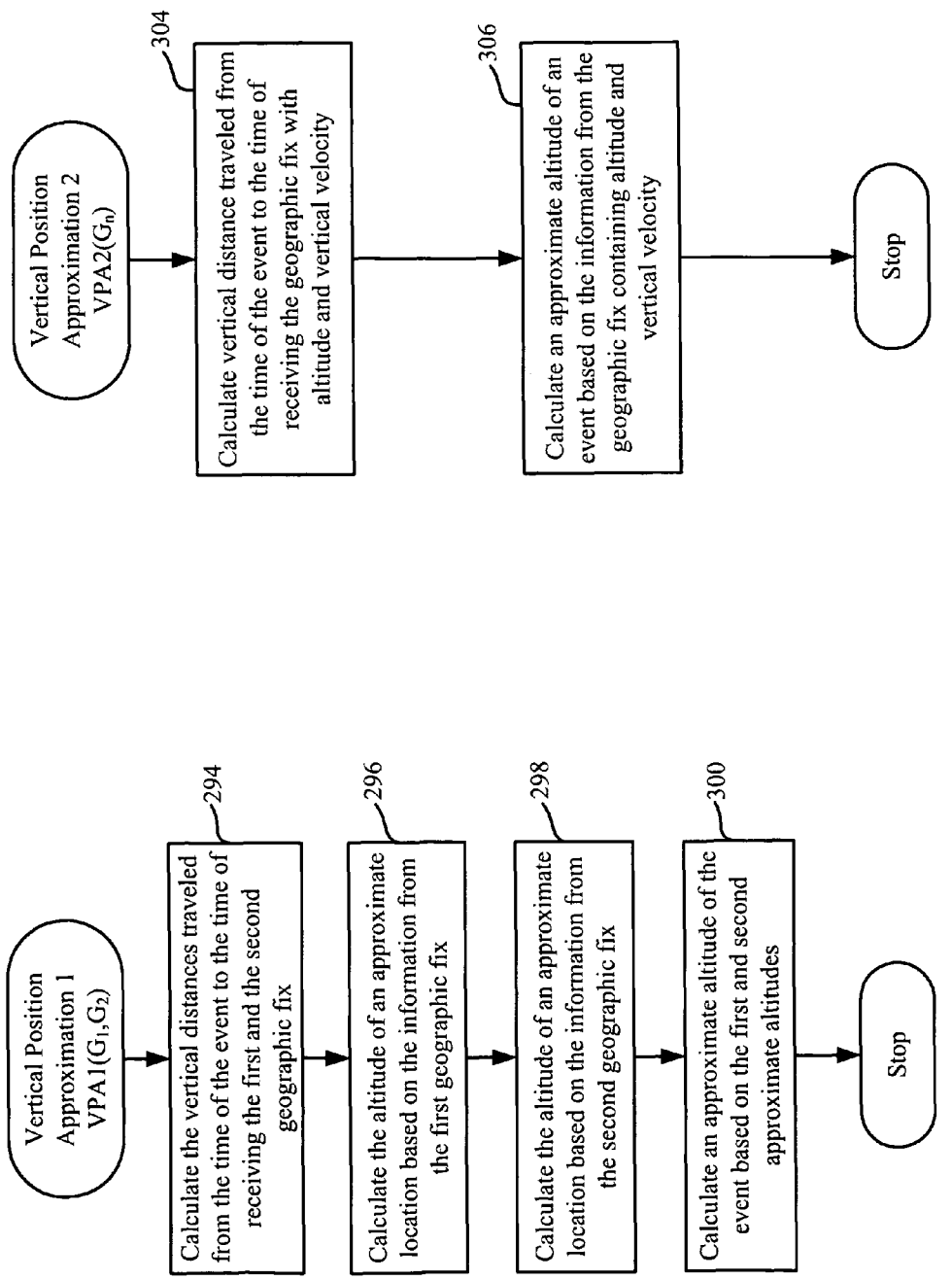

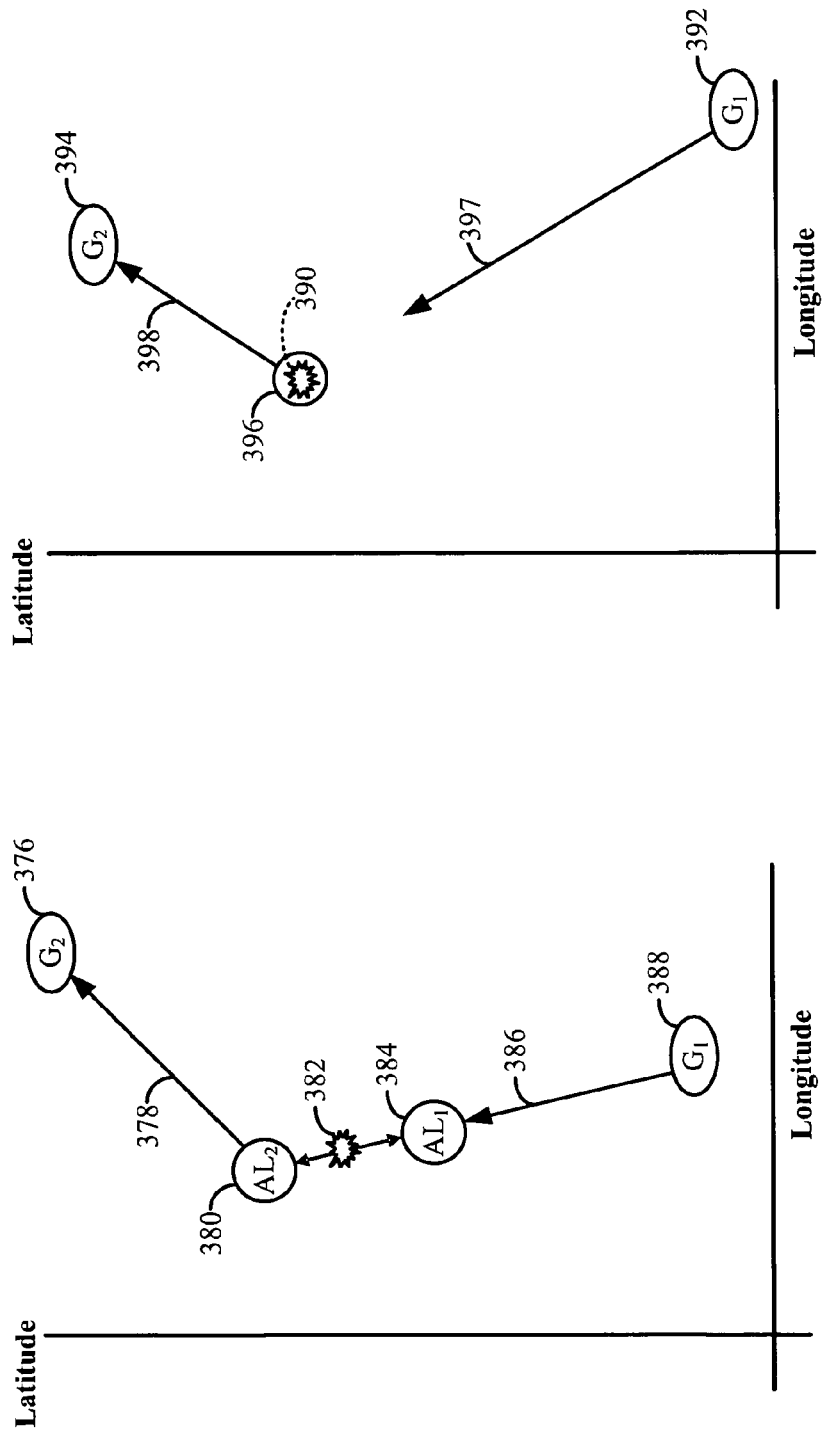

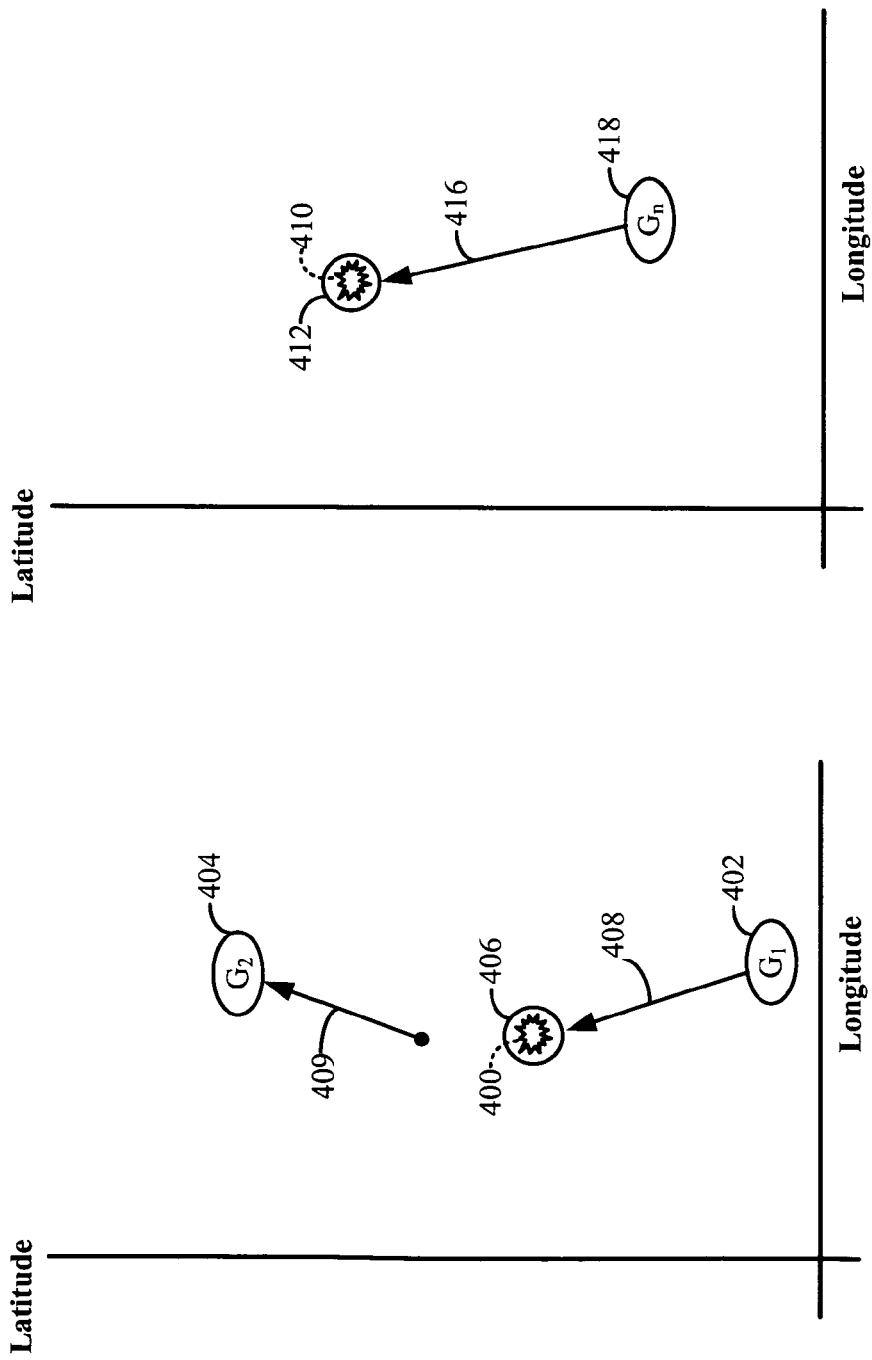

APPARATUS AND METHODS FOR GEOGRAPHIC POSITION APPROXIMATION OF AN EVENT OCCURRING ON A WIRELESS DEVICE

CLAIM OF PRIORITY UNDER 35 U.S.C. §119

The present Application for Patent claims priority to Provisional Application No. 60/757,743 entitled "Methods and Apparatus for GPS Approximation of an Event for a Wireless Device" filed Jan. 9, 2006, and assigned to the assignee hereof and hereby expressly incorporated by reference herein.

CROSS REFERENCE TO RELATED APPLICATIONS

This invention is related to U.S. patent application Ser. No. 11/139,301 entitled "Apparatus and Methods for Associating a Geographical Position with an Event Occurring on a Wireless Device," filed May 27, 2005, assigned to the assignee hereof and hereby incorporated by reference in its entirety.

BACKGROUND

The disclosed aspects relate to wireless devices and wireless communication networks, and more particularly, to apparatus and methods for determining an approximate geographical position corresponding to an event associated with a wireless device on a wireless network.

Many wireless communications devices, such as mobile phones, pagers, handheld computers, etc., have the ability to determine the location parameters associated with the geographical position of a wireless device on the surface of the earth. The location parameters may include the position and speed coordinates for the wireless device. The wireless device may include a geographical position location system in the form of hardware, software and/or firmware and other associated parameters.

For example, one wireless device geographical position location system receives and analyzes location parameters derived from the Global Positioning System (GPS), a radio-navigation system, developed and operated by the U.S. Defense Department, that includes a series of 24 constellation satellites orbiting the earth at a distance of approximately 20,000 kilometers. The GPS position location parameters permit wireless device processors to determine their respective three dimensional positions and velocities using very precise location parameters and timing signals received from the satellites.

Determination of wireless device geographical position location is not limited to GPS. For example, wireless devices may employ a type of Assisted GPS, where the GPS position location parameters are combined with additional information related to the wireless network, such as position information from wireless network base stations, to increase the accuracy of the position location information. The additional information is particularly important in urban areas, where there may be attenuation, blocking and multipath fading of the GPS signal.

Unfortunately, there are other problems associated with the use of GPS and other position location information by the wireless device that have not been addressed. Each time a wireless device requests and retrieves position location information, the request and retrieval processing consumes a relatively large amount of wireless device power. Further, if the wireless device does not support simultaneous voice and data calls, then the device will not be able to get a location position during a voice call, or make a voice call during retrieval of a location position.

Furthermore, the period of time from when the wireless device makes a requests for position location information to when the wireless device; receives the position location information may be significant, depending on such factors as the relative position of the wireless device to the location of the satellite, the speed at which the wireless device is traveling, the performance of the position location processing system of the wireless device, the type of position location system employed (for example, GPS, Assisted GPS, or other position location system), and the performance characteristics of the wireless device antenna. Such parameters may exacerbate the ability of the wireless device to accurately determine the geographical position location of the wireless device without draining wireless device power sources.

The foregoing limitations are particularly troubling when it is desired to determine the position of the wireless device upon the occurrence of wireless device operational events, such as a call drop event on a cellular telephone.

BRIEF SUMMARY

In one aspect, a method operable for approximating a geographic location corresponding to an event occurring on a wireless device may comprise obtaining a time of the event and at least one of a first set of location fix information corresponding to a first geographic position of the wireless device prior to the time of the event and a second set of location fix information corresponding to a second geographic position of the wireless device subsequent to the time of the event. The at least one set of location fix information may include a time, horizontal location information, and horizontal velocity information. Furthermore, the method may include calculating a latitude and a longitude of the event based upon at least one predetermined relationship between the event and the at least one set of the location fix information.

Another aspect includes at least one processor configured to perform the above actions.

A further aspect includes machine-readable medium comprising instructions which, when executed by a machine, cause the machine to perform the operations listed above.

In another aspect, an apparatus for estimating a geographic location corresponding to an event occurring on a wireless device comprises a plurality of means for carrying out the operations listed above.

Another aspect of an apparatus for approximating a geographic location corresponding to an event occurring on a wireless device comprises an event position determination module operable to obtain a time of the event and at least one of a first set of location fix information corresponding to a first geographic position of the wireless device prior to the time of the event and a second set of location fix information corresponding to a second geographic position of the wireless device subsequent to the time of the event. In this aspect, at least one of the first set of location fix information and the second set of location fix information includes a time, horizontal location information, and horizontal velocity information. Further, the event position determination module is operable to determine an approximate geographic location of the wireless device at the time of the event based on at least one predetermined relationship between the event and the at least one set of location fix information.

In other aspects, a method for tracking information relating to an event occurring on the wireless device comprises detecting an occurrence of an event on the wireless device, wherein the event is defined by an event tracking configuration. The method further includes storing event information relating to the detected occurrence of the defined event. Also, the method includes generating a position determination request based on the detected occurrence of the defined event. Additionally, the method includes storing a first set of location fix information prior to the occurrence of the defined event and a second set of location fix information subsequent to the occurrence of the defined event, wherein the second set of location fix information is based on the position determination request. Further, at least one of the location fix information comprises a geographic location and a horizontal velocity of the wireless device operable to be utilized in a predetermined relationship with the event information to determine an approximate geographic location of the wireless device upon the detected occurrence of the defined event Another aspect includes at least one processor configured to perform the above actions on a wireless device.

A further aspect includes machine-readable medium comprising instructions which, when executed by a machine, cause the machine to perform the operations listed above on a wireless device.

In another aspect, a wireless device for tracking information relating to an event occurring on the wireless device comprises a plurality of means for carrying out the operations listed above.

In still another aspect, a wireless device comprises a computer platform comprising a plurality of event data relating to an operation of the wireless device. The wireless device further comprises an event tracking module in communication with the computer platform and defining one of the plurality of events to track. The event tracking module further comprising event tracking logic operable to initiate storage of event information and further operable to generate a position determination request upon detecting the defined one of the plurality of events. The wireless device also includes a memory operable to store the event information and location fix information, wherein the location fix information comprises a first set of location fix information prior to the occurrence of the defined event and a second set of location fix information subsequent to the occurrence of the defined event. Further, at least one of the first and second set of location fix information comprises geographic location information and horizontal velocity information operable, based on a predetermined relationship with the event information, for determining an approximate geographic location of the wireless device upon the occurrence of the defined event.

Additional aspects and advantages are set forth in part in the description which follows, and in part are obvious from the description, or may be learned by practice of the disclosed aspects. The aspects and advantages of disclosed herein may also be realized and attained by the means of the instrumentalities and combinations particularly pointed out in the appended claims.

BRIEF DESCRIPTION OF THE DRAWINGS

The disclosed aspects will hereinafter be described in conjunction with the appended drawings provided to illustrate and not to limit the disclosed aspects, wherein like designations denote like elements, and in which:

FIG. 13 is a flowchart of one aspect of a method of approximating a vertical position of an event occurring on a wireless device according to the system of FIG. 1;

FIG. 14 is a flowchart of another aspect of a method of approximating a vertical position of an event occurring on a wireless device according to the system of FIG. 1;

FIGS. 18-22 are graphs of exemplary scenarios in which a location of an event occurring on a wireless device is approximated based upon the system of FIG. 1.

DETAILED DESCRIPTION

Figure 1:
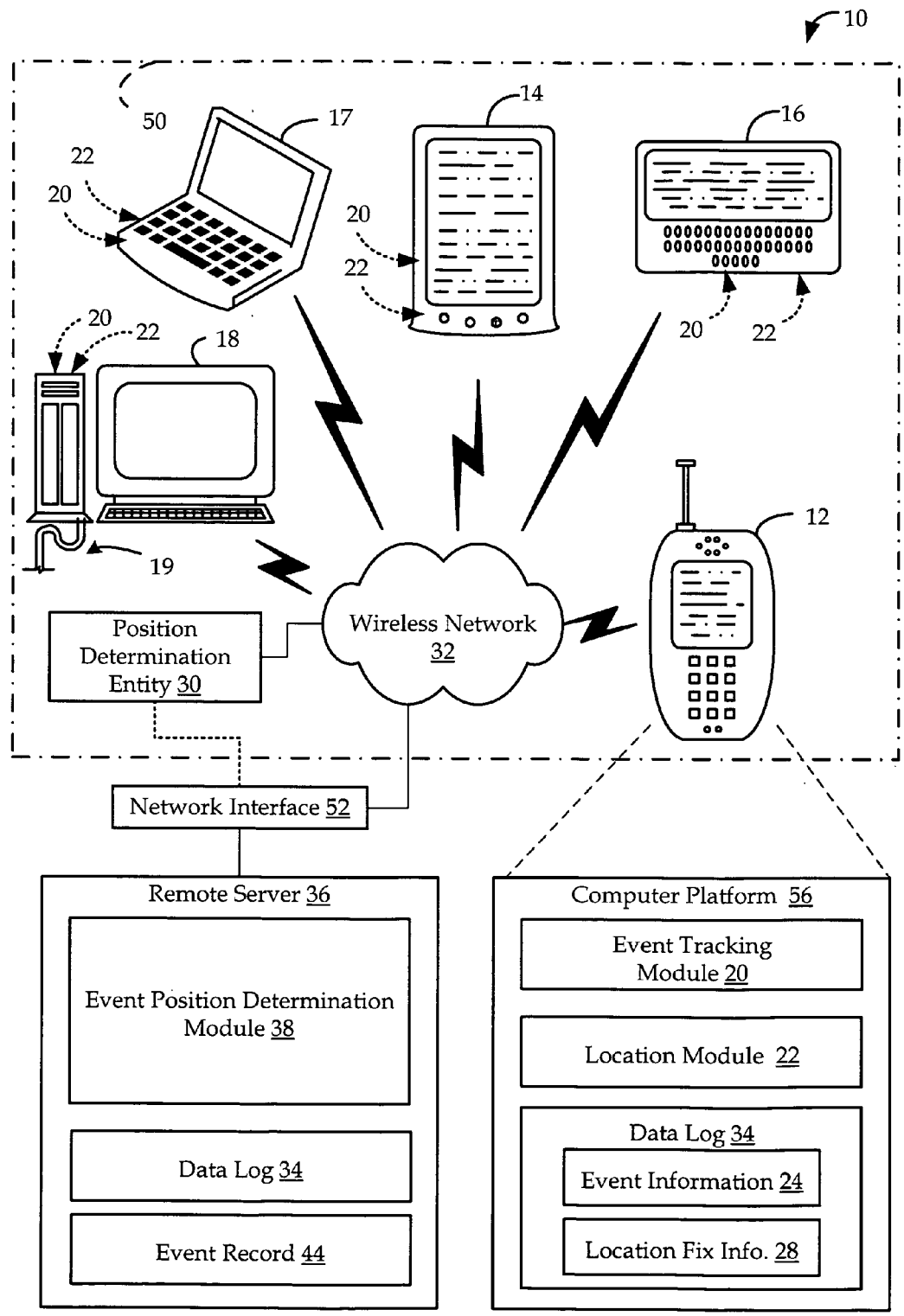
FIG. 1 is a representative diagram of one aspect of a system for approximating the position of an event detected by a wireless device operating on a wireless communication network.

In general, apparatus and methods are disclosed to determine an approximation of the location of a wireless device at the time of a detected event occurring on the wireless device. These apparatus and methods determine the approximate device location based on one and/or some combination of a first set of fix information obtained at a time prior to the time of the event, and a second set of information obtained subsequent to the time of the event. Generally, these apparatus and methods take into account the time difference between the event and the respective fix information, and utilize this time difference in combination with speed or velocity information in the respective fix information to estimate the approximate event location.

In some aspects, the wireless device detects an event based on a predetermined event tracking configuration. Further, the wireless device may include logic operable to trigger the determination and/or retrieval of at least one of pre-event and post-event location fix information. Additionally, in some aspects, the wireless device may further include logic operable to forward the respective fix information to another device, such as a user manager, for determining a location of the detected event.

The user manager server may include an event position determination module to determine a geographic position to associate with the detected event based on the received geographic fix information from the wireless device.

Before even considering using of the fix information, the user manager server may apply predetermined rules to the fix information to determine whether or not the respective fix information can be considered a "valid" point of reference on which to base an approximation. For example, these predetermined rules may include a time threshold and/or a distance threshold with respect to the time and/or distance between the respective fix and the event.

Additionally, the user manager server may analyze the first and second sets of geographic fix information to determine the type of information they contain. For example, fix information may include "relevant" information for use in approximating the location of detected event. For example, relevant fix information may include, but is not limited to, information such as time information, horizontal information, i.e., longitude and latitude information, altitude information, speed information and bearing information.

A "best" approximation of the location of the detected event may be made when all possible "relevant" information is available and can be considered. In cases where less than all relevant information is available in either one or both sets of fix information, the user manager server may apply predetermined rules which dictate which information to use and not use, and/or how to weigh certain information versus other information. For example, if both sets of fix information are considered valid and include all relevant data, then an approximation is made based on an algorithm that applies a predetermined weighting to the respective relevant data. In another example, if one or the other set of fix information is missing some predetermined relevant data, then the approximation algorithm may calculate the approximate location using the fix having all, or the greatest amount, of the relevant information.

Thus, as a result, the approximate location, i.e., longitude, latitude and/or altitude coordinates, of the wireless device at the time of the detected event is determined based on a predetermined algorithm that takes into account the "best available" information.

Table 1 below lists the definitions of acronyms used herein to facilitate the understanding of the aspects discussed herein.

TABLE 1

Definition of the Terms

| Term | Ref. Num. | Definition |
| --- | --- | --- |
| L | 200 | Approximate location of the event |
| L_lat | 202 | latitude coordinate of the event L |
| L_lon | 204 | longitudinal coordinate of the event L |
| L_alt | 206 | Altitude coordinate of L |
| $G_1$ | 208 | Geographic location fix received before the event L |
| $G_1$_lat | 216 | latitude coordinate of $G_1$ |
| $G_1$_lon | 218 | longitudinal coordinate of $G_1$ |
| $G_1$_alt | 220 | Altitude coordinate of $G_1$ |
| $G_1$_θ | 222 | Bearing of $G_1$ |
| $G_2$ | 224 | Geographic location fix received after the event L |
| $G_2$_lat | 230 | latitude coordinate of $G_2$ |
| $G_2$_lon | 232 | longitudinal coordinate of $G_2$ |
| $G_2$_alt | 234 | Altitude coordinate of $G_2$ |
| $G_2$_θ | 236 | Bearing of $G_2$ |

TABLE 1-continued

Definition of the Terms

| Term | Ref. Num. | Definition |
| --- | --- | --- |
| $AL_1$ | 238 | Approximate location of the Event calculated based upon $G_1$ |
| $AL_1$_lat | 240 | latitude coordinate of $AL_1$ |
| $AL_1$_lon | 242 | longitudinal coordinate of $AL_1$ |
| $AL_1$_alt | 244 | Altitude coordinate of $AL_1$ |
| $AL_2$ | 246 | Approximate location of the Event calculated based upon $G_n$ |
| $AL_2$_lat | 248 | latitude coordinate of $AL_2$ |
| $AL_2$_lon | 250 | longitudinal coordinate of $AL_2$ |
| $AL_2$_alt | 252 | Altitude coordinate of $AL_2$ |
| $Hd_1$ | 254 | Horizontal distance between $G_1$ and $AL_1$ |
| $Hd_2$ | 256 | Horizontal distance between $G_2$ and $AL_2$ |
| $Vd_1$ | 258 | Vertical distance between $G_1$ and $AL_1$ |
| $Vd_2$ | 260 | Vertical distance between $G_2$ and $AL_2$ |

Referring to FIG. 1, some aspects of a system 10 may include any mobile or portable communications device operable, within a wireless network area 50, to communicate wirelessly with wireless network 32. Such mobile or portable communications devices may include cellular telephone 12, personal digital assistant 14, two-way text pager 16, a laptop computer 17, a tablet computer, and even a separate computer platform 18 that has a wireless communication portal, and which also may have a wired connection 19 to a network. Non-limiting, wireless devices 12, 14, 16, 17 and 18, are hereafter collectively referred to as wireless device 12.

Wireless device 12 may be a remote-slave, or other device that does not have an end-user thereof, but simply communicates data across the wireless network 32, e.g., a remote sensor, a diagnostic tool, a data relay, etc. Accordingly, the apparatus and methods described herein may be applied to any form of wireless communications device or module, including a wireless communication portal, a wireless modem, PCMCIA cards, access terminals, personal computers, telephones, or any combination or sub-combination thereof.

Wireless device 12 may include a local computer platform 56 operable to permit the wireless device to transmit data across wireless network 32, receive data from wireless network 32, receive and execute software applications, and display data transmitted from remote server 36 or from another computer device connected to wireless network 32.

Computer platform 56 may comprise an event tracking module 20 and a location module 22 collocated with the respective wireless device or remotely accessible by the wireless device 12. The event tracking module 20 is operable, upon detection of a predetermined wireless device-based event, to gather event information 24 associated with the configuration and to initiate the collection of device location information from location module 22 to associate with the detected event. For example, in one aspect, the wireless device detects an event based on a predetermined event tracking configuration, wherein the event tracking configuration may be configured to gather information about network and/or device performance by tracking predetermined events, such as events defined in a communication protocol, and/or predetermined combinations and/or sequences of data associated with the operation of the wireless device. For example, a predetermined event may include a communications-related event such as a dropped call, an access failure, a handover, an idle failure, an out-of-service event, an in-service event, etc. In other aspects, for example, an event may comprise a detectable non-communications-related occurrence in an application running on the wireless device.

Location module 22, in some aspects, may be operable to retrieve location fix information 28, comprising a plurality of location-related parameters, from a position determination entity 30 in communication with wireless network 32. In other aspects, location module 22 may be operable to locally generate location fix information 28 based on communications with entity 30 over network 32. Additionally, fix information 28 may be received based upon configured periodic retrievals of location fix information performed by location module 22, and/or by location fix information dictated by other modules or applications operating on the respective wireless device.

Modules 20 and 22 may include one or any combination of software, hardware, and firmware and may further include any executable instructions operable by one or more processors resident on, or remote from, the wireless device 12. For example, the wireless device may include logic that triggers location module 22 to retrieve post-event location fix information upon detection of the configured event.

Furthermore, each wireless device 12 may store event information 24 and location fix information 28 in a data log 34 transferable to and/or retrievable by a remote server 36 located across wireless network 32. It should be noted that data log 34 may comprise a plurality of location fix information 28 pertaining to multiple geographic fixes received prior to, and/or subsequent to, one or more event detected by event tracking module 20.

In one aspect, a remote server 36 may receive the data log 34 from the wireless device 12. The remote server 36 may include an event position determination module 38 which may be operable to approximate a location of the detected event based on the recorded fix information 28. For example, remote server 36 may be operable to calculate a longitude, latitude, and/or an altitude of the detected event. In another aspect, event position determination module 38 may be resident on the wireless device 12, and the wireless device may be operable to approximate a location of a detected event locally as an alternative to processing the information 28 on the remote server 36. In any case, event position determination module 38 may be further operable to generate and store the approximated event location, and optionally other event-related information, in an event record 44.

Thus, system 10 provides apparatus and methods for approximating a geographical position corresponding to an event occurring on a wireless device. These apparatus and methods include receiving a time of the event and at least one of: a first set of location fix information corresponding to a first geographic position of the wireless device prior to the time of the event; and a second set of location fix information corresponding to a second geographic position of the wireless device subsequent to the time of the event. In this case, at least one set of the location fix information includes a timestamp, horizontal location information, and horizontal velocity information. Further, these apparatus and methods include approximating a latitude and a longitude of the event based upon at least one predetermined relationship between the event and at least one of the first set of location fix information and the second set of location fix information. In this case, the predetermined relationship attempts to approximate the event location using the best available information from one and/or both sets of fix information, thereby providing a best approximation based on the available information.

Referring to FIG. 1, wireless network 32 includes, in addition to all network components, and all connected devices that form the network 32, any communications network operable, at least in part, for enabling wireless communications between a wireless device 12 and any other device connected to wireless network 32. Wireless network 32 may include at least one, or any combination, of: a cellular telephone network; a terrestrial telephone network; a satellite telephone network; an infrared network such as an Infrared Data Association (IrDA)—based network; a short-range wireless network; a BLUETOOTH technology network; a home radio frequency (HomeRF) network; a shared wireless access protocol (SWAP) network; an ultra wide band (UWB) network; a ZIGBEE protocol network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: code division multiple access, wideband code division multiple access, universal mobile telecommunications system, advanced mobile phone service, time division multiple access, frequency division multiple access, global system for mobile communication, analog and digital satellite systems, and any other technologies/protocols that may be used in at least one of a wireless communications network and a data communications network.

Network interface 52 may be any mechanism that allows remote server 36 to communicate with wireless network 32 and/or position determination entity 30. For example, network interface 52 may include a local area network that connects remote server 36, and/or position determination entity 30, through an Internet Service Provider to the Internet and in turn to wireless network 32.

Figure 2:
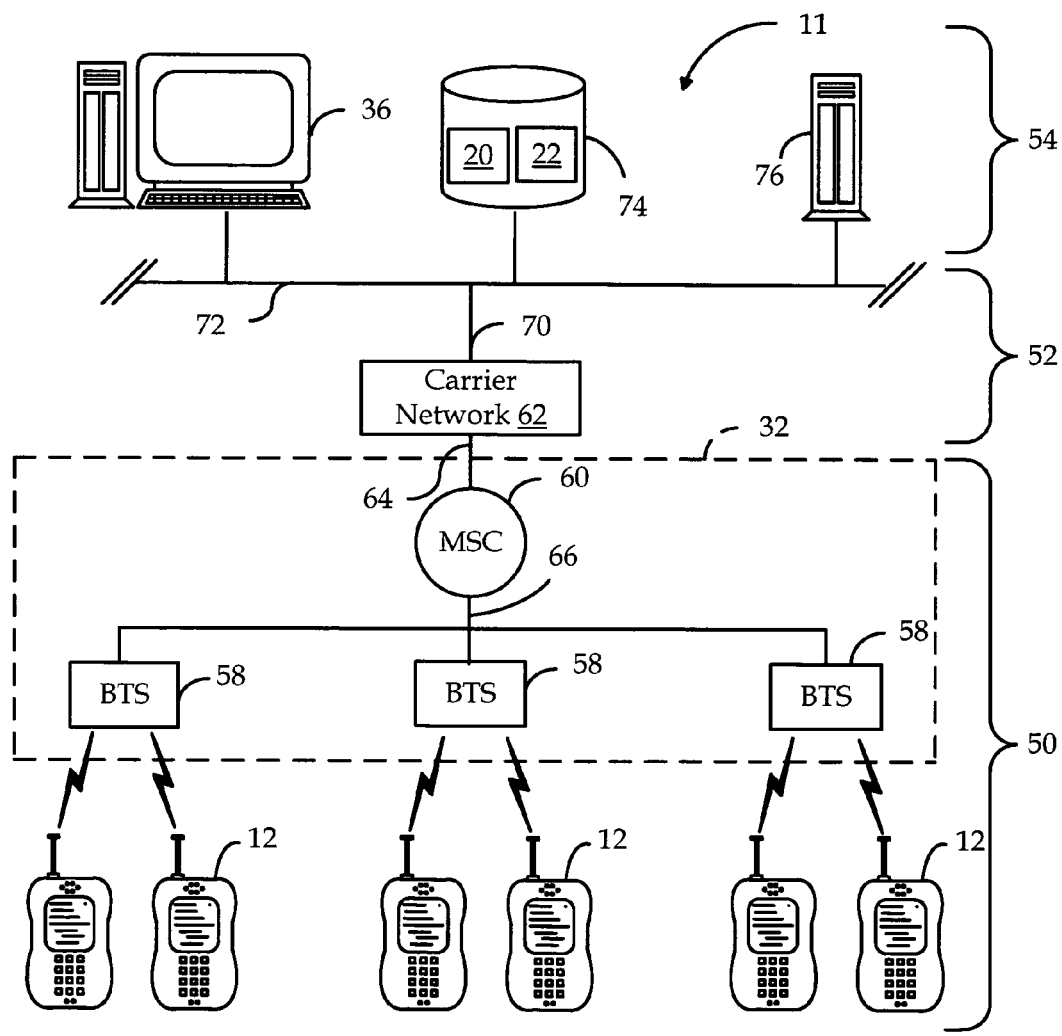
FIG. 2 is a schematic diagram of one aspect of a cellular telephone network aspect of the system of FIG. 1.

Referring to FIG. 2, in one non-limiting aspect of the system 10 (FIG. 1), a cellular telephone network 11 may include a plurality of cellular telephones 12, a network interface 52, and a server environment 54.

As illustrated, wireless network area 50 may include a plurality of cellular telephones 12, a wireless network 32, multiple base stations (BTS) 58, and a mobile switching center (MSC) 60.

MSC 60 may be connected to carrier network 62 through either a wired or wireline connection network 64. For example, network 64 may comprise a data services network, a switched voice services network, often referred to as POTS ("plain old telephone service"), and/or a combination of both, including for example an Internet portion of a network for data information transfer and a POTS portion of a network for voice information transfer.

MSC 60 may also be connected to the multiple BTSs 58 by another network 66 operable to carry data and/or switched voice information. For example, network 66 may comprise a data network, a voice network, and/or a combination of both, including for example, an Internet portion of a network for data transfer and a POTS portion of a network for voice information transfer.

Each BTS 58 may be wirelessly connected to a cellular telephone 12 in wireless network area 50. For example, BTS 58 may ultimately broadcast messages wirelessly to cellular telephones 12 or receive messages wirelessly from cellular telephones 12 via POTS switched voice service; data transfer services, e.g., short messaging service (SMS); or other over-the-air methods.

Still referring to FIG. 2, network interface 52 is shown to include carrier network 62, data link 70 and local area network (LAN) 72. The features and functions associated with data link 70 and LAN 72 are described below with reference to server environment 54.

Carrier network 62 is any regional, national or international network offering switched voice communication and/or data communication services. As such, carrier network 64 may include switched voice or data service provider communications facilities and lines, including data and/or switched voice information, or any combination of both, including for example an Internet portion of a network for data transfer and a POTS portion of a network for voice information transfer. In some aspects, carrier network 62 controls messages, generally in the form of data packets, sent to or received from a MSC 60.

FIG. 2 further includes a server environment 54 that may include remote server 36, a separate data repository 74, and data management server 76, wherein remote server 36 and data management server 76 are operable to communicate with carrier network 62 through a data link 70, such as the Internet, a secure LAN, WAN, or other network.

Remote server 36, in communication with data repository 74 over LAN network 72 is operable to store data, i.e., data logs 34, gathered from the remote wireless devices 12. Further, data management server 76, in communication with remote server 36, may provide post-processing capabilities, data flow control, etc. Network 11, including remote server 36, data repository 74 and data management server 76, may further comprise any other network components needed to provide cellular telecommunication services.

Figure 3:
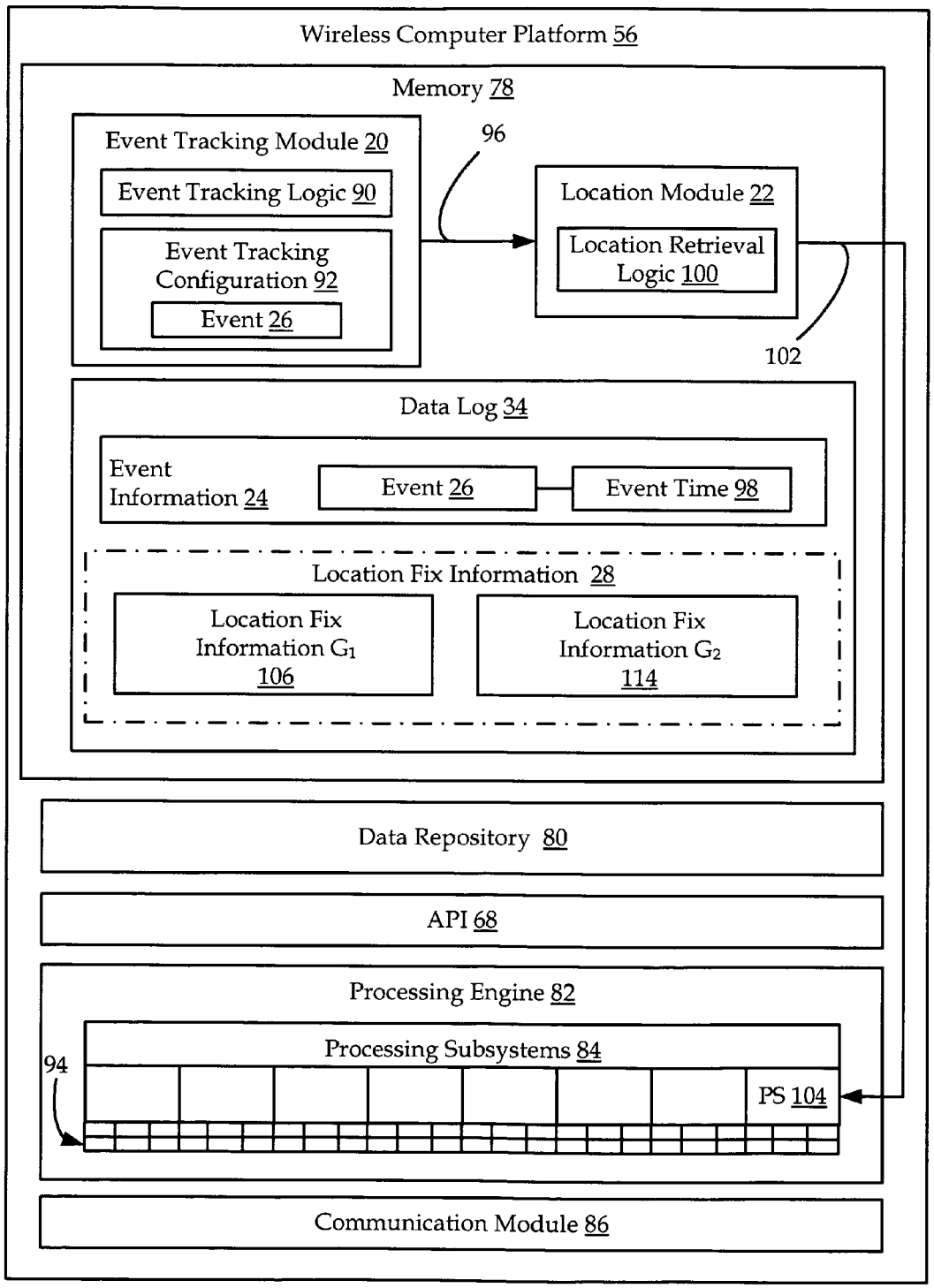
FIG. 3 is a block diagram of one aspect of a computer platform associated with the wireless device of FIG. 1.

Referring to FIG. 3, each of the wireless device operating within system 10 (FIG. 1) may include a computer platform 56 operable to enable the detection of a predetermined event and the collection of fix information. For example, in some aspects, computer platform 56 may include memory 78, application programming interface (API) 68, and a processing engine 82. In the disclosed aspects, each of the aforementioned components may be resident on, or remotely accessible by, the wireless device 12.

Processing engine 82 may comprise an application-specific integrated circuit (ASIC), or other chipset, processor, microprocessor, logic circuit, or other data processing device operable to perform one or more processing functions for the respective wireless device including executing an API layer 68 that interfaces with a module, e.g., event tracking module 20 and location module 22, resident on or remotely accessible from wireless device 12 to perform a given function. The foregoing is performed through API software extensions, as described below. Furthermore, processing engine 82 may include various processing subsystems 84, embodied in hardware, firmware, software, and combinations thereof, that enable the functionality of the wireless device 12 and the operability of the respective device on wireless network 32, such as initiating and maintaining communications, and exchanging data with other networked devices.

For example, in one aspect of a cellular telephone, processing engine 82 may include one or a combination of processing subsystems 84, such as: sound, non-volatile memory, file system, transmit, receive, searcher, layer 1, layer 2, layer 3, main control, remote procedure, handset, power management, diagnostic, digital signal processor, vocoder, messaging, call manager, BLUETOOTH system, BLUETOOTH LPOS, position determination, position engine, user interface, sleep, data services, security, authentication, USIM/SIM, voice services, graphics, USB, multimedia such as MPEG, GPRS, etc.

For the disclosed aspects, processing subsystems 84 of processing engine 82 may include any subsystem components that interact with applications executing on computer platform 56. For example, processing subsystems 84 may include any subsystem components which receive data reads and data writes from application programming interfaces (APIs) 68 installed onto the local computer platform 56. APIs allow software developers to create software applications that operate on the cellular telephone, and control certain functionality on the device, including event tracking module 20 and location module 22.

API 68 may comprise a runtime environment executing on the respective wireless device. An exemplary runtime environment is Binary Runtime Environment for Wireless® (BREW) software developed by Qualcomm, Inc., of San Diego, Calif. Other runtime environments may be utilized that, for example, operate to control the execution of applications on wireless computing devices. API 68 may include a class of software extensions that allow the resident version, or remotely accessible version, of a module to be processed by processing engine 82. These software class extensions may communicate with processing subsystems 84 on the wireless device and may allow both data reads and commands. For example, the software extension may send commands on behalf of the applications that invoke it. The module may then forward the responses of the subsystems across wireless network area 50 to remote server 36. Each resident application or module on wireless device may create an instance of the new software extension to communicate. with the subsystems independent of the other applications or modules.

Memory 78 may be any type of memory, including read-only memory (ROM), random-access memory (RAM), EPROM, EEPROM, flash memory cells, secondary or tertiary storage devices, such as magnetic media, optical media, tape, or soft or hard disk, whether resident on computer platform 56 or remotely accessible from computer platform 56.

Computer platform 56 may also include a data repository 80 that can store the software applications, files, and/or data not actively used in memory 78, such as the software applications or data downloaded from remote server 36. The data repository 80 may include one or more flash memory cells or may include a secondary or tertiary storage device, such as magnetic media, EPROM, EEPROM, optical media, tape, or soft or hard disk. Additionally, the data repository 80 may host a local copy of event tracking module 20 and location module 22.

Additionally, computer platform 56 may further include a communication module 86 operable to send and/or receive signals and/or information to and/or from components within the respective wireless device and between the wireless device and an external device. For example, communication module 86 may include one or any combination of hardware, software, firmware, executable instructions and data to enable the transfer of communications-related signals and information. For instance, communication module 86 include one or any combination of input and/or output ports, transmit and receive chain components, transceivers, antenna, etc.

In some aspects, memory 78 may comprise event tracking module 20 including logic 90 operable to carry out operations based on an event tracking configuration 92. For example, event tracking module 20 may be operable to receive event tracking configuration 92 from another device, such a remote server 36. Event tracking configuration 92 may include, but is not limited to, one or any combination of parameters operable to define one or any combination of what predetermined event 26 to monitor, when to perform the monitoring, how often to collect and/or store the monitored data, and when and/or to whom to provide access to and/or to transmit the collected data. For instance, event tracking module 20 may be executable by communications processing engine 82 through API 68 to carry out these operations.

Additionally, predetermined event 26 may include, but is not limited to, an occurrence on the respective wireless device of an event, which may be one, a combination and/or a sequence of events and/or data specifically defined by configuration 92. Further, predetermined event 26 may occur in another application executing on the wireless device, may be specifically defined by a communications protocol utilized by the wireless device, and may be one and/or a combination of predetermined events, predetermined data, and/or predetermined sequences or sets of data and/or events as defined by configuration 92. Predetermined event 26 may be detectable in processing data 94 within processing engine 82 and/or processing subsystems 84, within over-the-air (OTA) messages received and/or transmitted by communication module 86, and within registers, logs, electronic filing systems, etc. located on the wireless device.

Upon detection of event 26 as defined by event tracking configuration 92, event tracking logic 90 may cause event information 24 to be stored in data log 34 based on configuration 92. In some aspects, for example, event information 24 includes, but is not limited to, an event identifier 26 and an event time 198. Event identifier 26 may include, but is not limited to, a description, indicator and/or representation of the configured event. Event time 198 defines the time of occurrence of the event, such as may be defined by a timestamp (Ets) from an internal or external clock or other timekeeping component in communication with the wireless device. Further, upon detection of event 26, event tracking logic 90 may trigger a position determination request 96 to be sent to location module 22 in order to gather geographic position information to associate with the detected event.

Location module 22 may comprise location retrieval logic 100 operable to allow location module 22 to receive the position determination request 96 and subsequently generate a location fix request 102 through API 68 to a designated processing subsystem component 84, such as a position service (PS) component 104. Additionally, location retrieval logic 100 is executable to initiate storage of the resulting location fix information 28 in data log 34.

In some aspects, PS component 104, when executed by processing engine 82, may retrieve location fix information 28 from an external source, such as position determination entity 30 (FIG. 1). The aforementioned location fix request 102 received by PS component 104 may, for example, be generated upon powering up of the wireless device, upon initiating execution of a given application or module, upon predetermined time intervals, upon other specific requests from other applications or modules, and/or upon a synchronized time basis, etc. In the disclosed aspects, PS component 104 is one example of a component used in coordination with, or in relation to, the components of location module 22.

In other aspects, or in addition, location module 22 and/or position determination entity 30 may further comprise, in whole or in part, a geographic information system (GIS), such as a tool used to gather, transform, manipulate, analyze, and produce information related to the surface of the earth. Such a GIS can be as complex as a whole system using dedicated databases and workstations hooked up to a network, or as simple as "off-the-shelf" desktop software. One example of such a system may include the QPoint™ Positioning Software and gpsOne® hybrid Assisted GPS wireless location technology, available from Qualcomm, Inc. of San Diego, Calif.

In some aspects, such a GIS may include a global positioning system (GPS), such as a satellite navigational system formed by satellites orbiting the earth and their corresponding receivers on the earth. The GPS satellites continuously transmit digital radio signals that contain data on the satellites' location and the exact time to the earth-bound receiver. The satellites are equipped with atomic clocks that are precise, for example, to within a billionth of a second. Based on this information the receivers know how long it takes for the signal to reach the receiver on earth. As each signal travels at the speed of light, the longer it takes the receiver to get the signal, the farther away the satellite is located. By knowing how far away a satellite is, the receiver knows that it is located somewhere on the surface of an imaginary sphere centered at the satellite. By using three satellites, GPS can calculate the longitude and latitude of the receiver based on where the three spheres intersect. By using four satellites, GPS can also determine altitude. In addition to transmitting location parameters associated with the location of the wireless devices, the GPS satellites may also transmit speed parameters associated with the speed of the wireless devices.

In other aspects, such a GIS may include, in whole or part, a network-based positioning system whereby location module 22, PS component 104, and/or some other remote position determination entity 30, determine the geographical position of the wireless devices based, at least in part, on network communications. For instance, communication signals may be exchanged between the respective wireless device and network components of wireless network area 50. These communication signals include timing information that enables location module 22, PS component 104, and/or some other remote position determination entity 30 to compute a relative position, and hence a geographic position, of the wireless device with respect to a known position. For example, such communications signals may include the signals periodically exchanged between wireless device 12 and BTS 58. Such a network-based system may also be utilized in combination with a GPS-based system.

Figure 4:
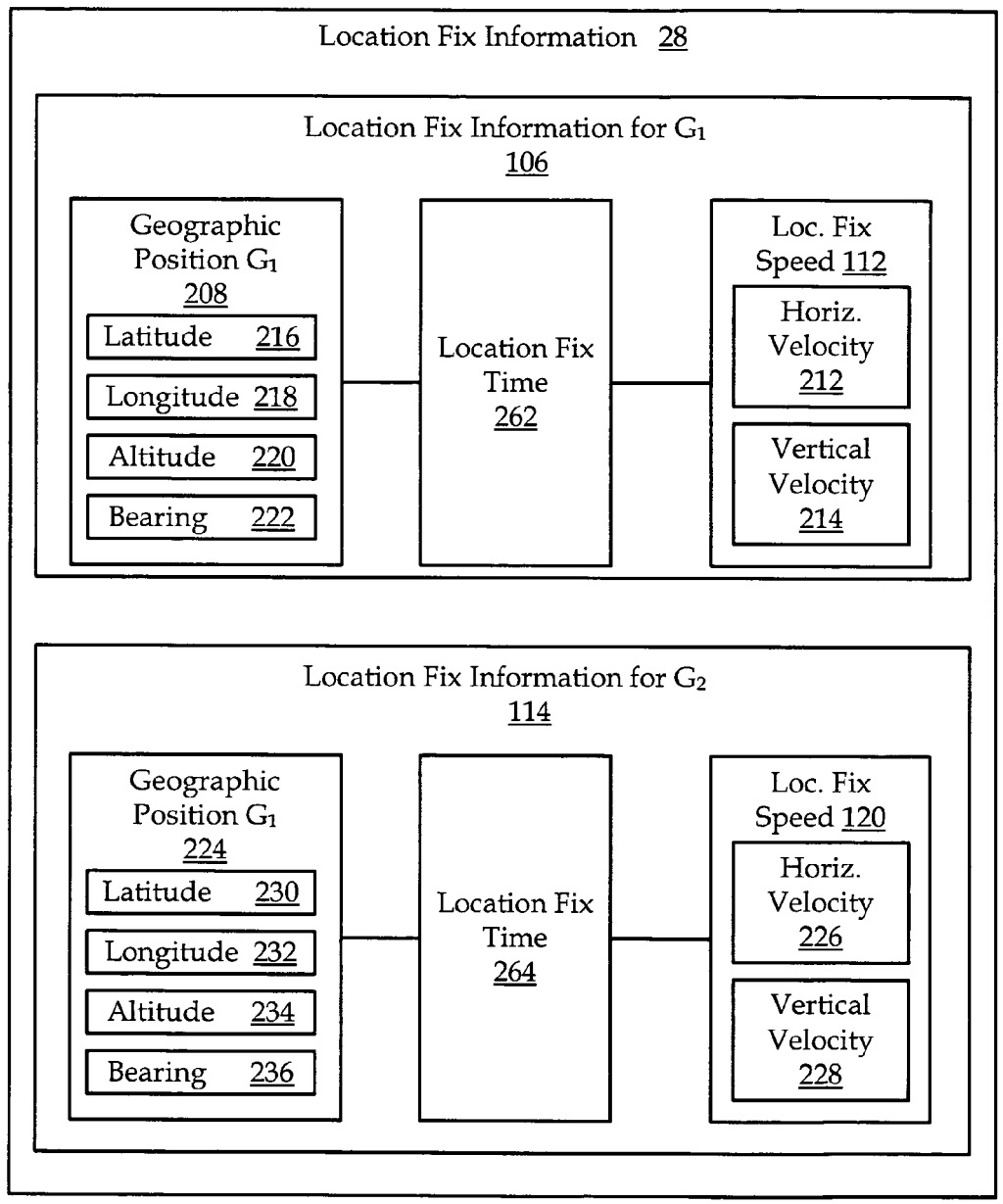
FIG. 4 is a block diagram of one aspect of location fix information stored on a wireless device according to the system of FIG. 1.

Referring to FIG. 4, data log 34 (FIG. 3) may be operable to store a plurality of location fix information 28. Depending upon the technical capabilities of the position determination entity 30 (FIG. 1), the location fix information 28-may comprise one or any combination of geographic position information such as a latitude coordinate, a longitude coordinate, an altitude coordinate and a current bearing (horizontal and/or vertical) of the located device. In addition, the location fix information 28 may include a time stamp, such as may be supplied by the position determination entry 30, indicating a time associated with the location fix information 28. In other aspects, the time stamp included within location fix information 28 may be the time of receipt of the geographic position information. Furthermore, the position determination entity 30 may be operable to provide one or both of the horizontal and vertical velocity at which the device was traveling at the time of position determination.

Figure 5:
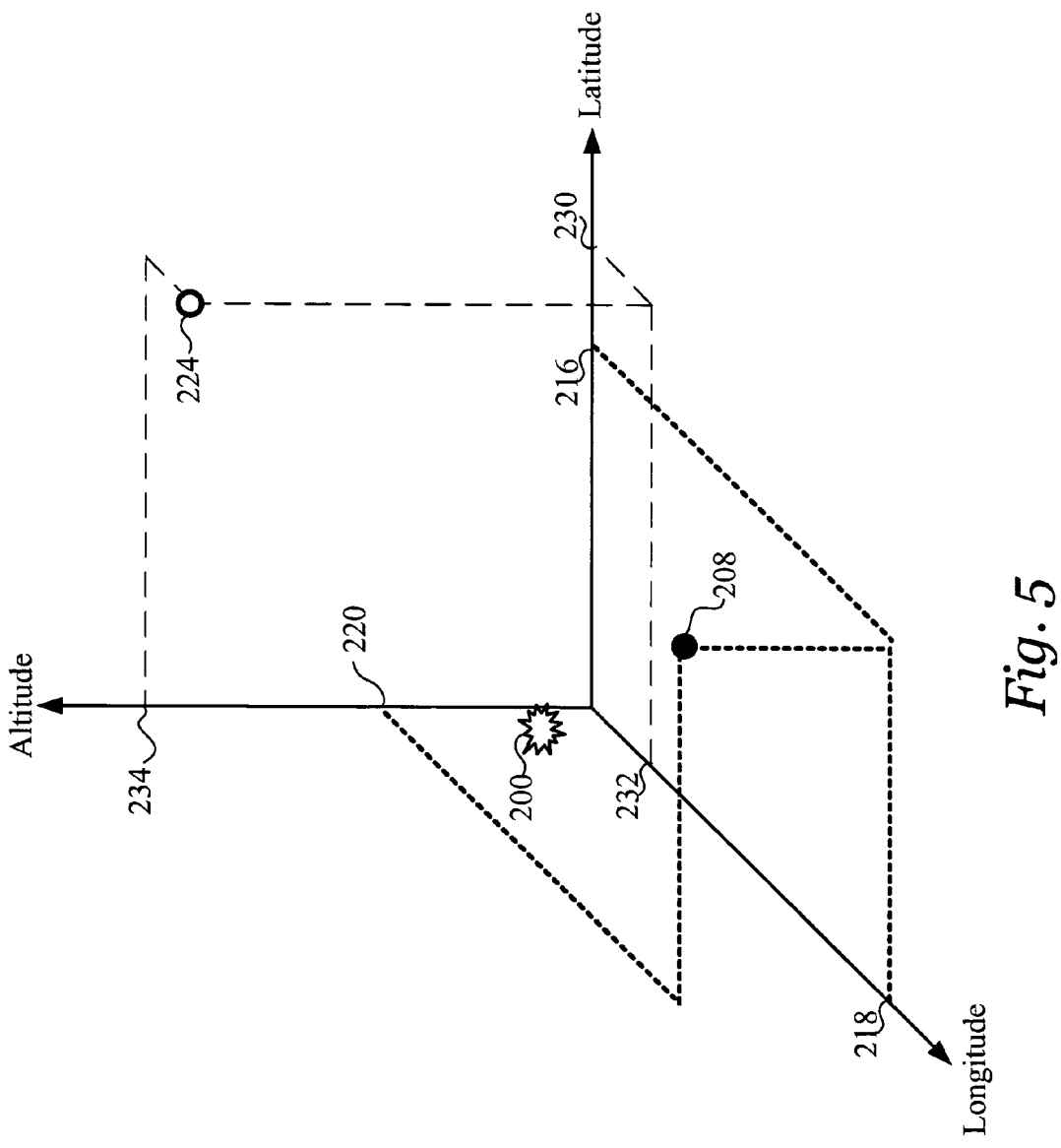
FIG. 5 is a graph of one aspect of a relationship between a first geographic fix and a second geographic fix of the wireless device of FIG. 1 with respect to a geographic location of a predetermined event occurring on the wireless device.

For example, location fix information 28 may include a first set of location fix information 106 pertaining to a first geographic fix $G_1$ 208 (FIGS. 4 and 5) received prior to the time 98 (FIG. 3) of event 26 (FIG. 3) and/or a second set of location fix information 114 pertaining to a second geographic fix $G_2$ 224 (FIGS. 4 and 5) received after the time 98 of event 26. Thus, depending on the given scenario, first geographic fix $G_1$ 208 and second geographic fix $G_2$ 224 may represent or may be geographically spaced apart from event location L 200.

For instance, location fix information 106 for geographic position $G_1$ 208 may include one or any combination of: a latitude coordinate ($G_1\_lat$) 216 (FIGS. 4 and 5); a longitude coordinate ($G_1\_lon$) 218 (FIGS. 4 and 5); an altitude ($G_1\_alt$)

220 (FIGS. 4 and 5); a bearing component ($G_1\_\theta$) 222; a timestamp ($G_1\_ts$) 262 of a time of the fix, which in this case, is a time prior to the event time 98; and a location fix speed 112 indicating the speed of the wireless device 12, which may have a horizontal velocity component ($G_1\_hv$) 212 and/or a vertical velocity component ($G_1\_vv$) 214.

Similarly, for example, location fix information 114 for geographic fix $G_2$ 224 may include one or any combination of: a latitude coordinate ($G_2\_lat$) 230 (FIGS. 4 and 5); a longitude coordinate ($G_2\_lon$) 232 (FIGS. 4 and 5); an altitude ($G_2\_alt$) 234 (FIGS. 4 and 5); a bearing component ($G_2\_\theta$) 236; a timestamp ($G_2\_ts$) 264 of a time of the fix, which in this case is subsequent to event time 98; and a location fix speed 112 indicating a speed of the wireless device 12 at the time of the fix 224, which may include a horizontal velocity component ($G_2\_hv$) 226 and/or a vertical velocity component ($G_2\_vv$) 228.

Additionally, event tracking module 20 may be operable to initiate the analysis of data log 34, such as by initiating the transfer of data log 34 to another device and/or by allowing another device to remotely access data log 34. For example, in some aspects, event tracking module 20 in combination with communication module 86 are operable to forward data log 34 to another device, such as remote server 36, based on configuration 92.

Figure 6:
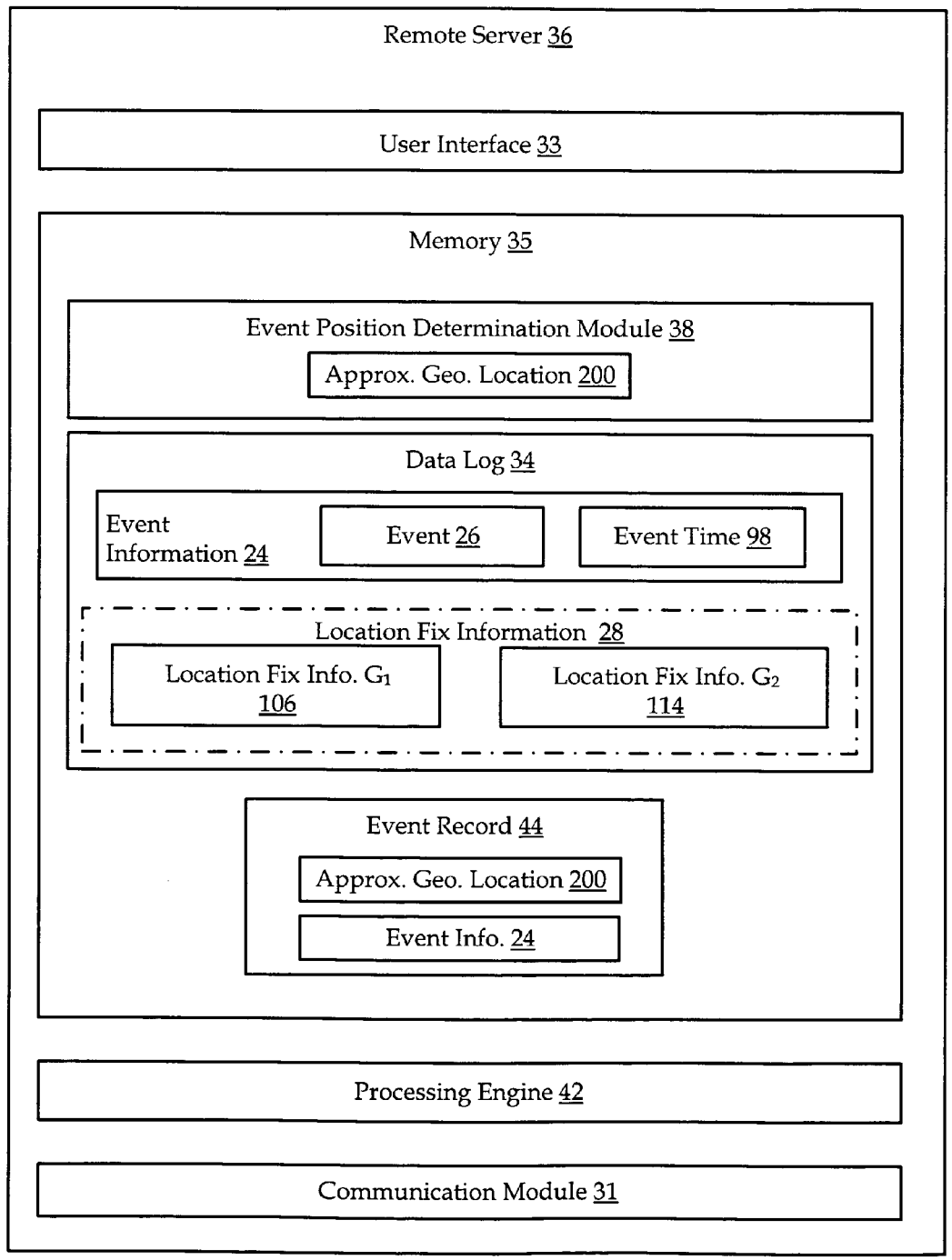
FIG. 6 is a block diagram of one aspect of the remote server of FIG. 1.

Referring to FIG. 6, remote server 36 is operable to receive data log 34 from the respective wireless device 12 in order to approximate a geographic position L 200 that can be associated with a detected event 26. The resulting approximate geographic location L 200 may be stored in event record 44, and may be presented in any format, such as in a table, in a graphic, in an audio file, etc., that enables a user of system 10 to utilize the associated event 26 and approximated location 200.

Furthermore, in one or more aspects, remote server 36 (or plurality of servers) may transmit software agents, or applications, including event tracking module 20 and/or location module 22, to wireless device 12 such that the wireless device return data from their resident applications and subsystems.

Further, there can be separate servers or computer devices associated with remote server 36 that work in concert to provide data in usable formats, and/or a separate layer of control in the data flow between the wireless device 12 and remote server 36.

Remote server 36 may comprise a processing engine 42 that may be any combination of processors, including an application-specific integrated circuit (ASIC), a chipset, a processor, a microprocessor, a logic circuit, and any other data processing device. Processing engine 42 performs one or more processing functions for remote server 36. Accordingly, processing engine 42 may execute a module resident on or remotely assessable by remote server 36 to perform a given function.

Remote server 36 may further include a memory 35 for storing data and/or executable instructions, etc. Memory 35 may include, but is not limited to, one or any combination of a read-only memory (ROM), a random-access memory (RAM), an EPROM, an EEPROM, a flash memory cell, a secondary or tertiary storage device, such as magnetic media, optical media, tape, or soft or hard disk, whether resident on remote server 36 or remotely accessible from remote server 36.

Additionally, remote server 36 may further include a communication module 31 operable to send and/or receive signals and/or information to and/or from components within the respective wireless device and between the wireless device and an external device. For example, communication module 31 may include one or any combination of hardware, software, firmware, executable instructions and data to enable the transfer of communications-related signals and information. For instance, communication module 31 may include one or any combination of input and/or output ports, transmit and receive chain components, transceivers, antenna, etc. Further, for example, user commands transmitted via communication module 31 over a standard HTTP, an FTP or some other data transfer protocol to the respective wireless device, may, by action of processing engine 42, be invoked to execute event position determination module 38 to provide access to and processing of data log 34 to generate event record 44. Alternatively, the wireless device 12 may forward data log 34 to the remote server 36, via communication module 31, based upon parameters within the configuration 92.

Additionally, remote server 36 may further include a user interface 33 to allow communication with a user of the remote server 36. In the disclosed aspects, access to, processing of, and updating of any of the components of remote server 36, whether the components are resident on remote server 36 or remotely accessible by remote server 36, may be performed by a user in operation of user interface 33, or any combination of software, hardware, firmware and executable instructions operable by one or more processors, through either a direct or remote connection, from any of a wireless device 12, remote server 36, or any other network component. For example, user interface 33 may comprise one or more input mechanism, and/or one or more output mechanisms.

In some aspects, memory 35 of remote server 36 may include one or more of the data logs 34, which may comprise one or more sets of location fix information 28 and event information 24 from one or more wireless devices. In some aspects, for example, remote server 36 receives data log 34 via communication module 31, such as from across wireless network 32 from a wireless devices 12 based on an execution of event tracking configuration 92 on the wireless device.

Memory 35 may also include event position determination module 38, which may be operable to collect and validate the collected location fix information 28, to approximate a location 200 of an event 26, and to generate and store event record 44 detailing the approximate location and/or the corresponding detected event-relate information. In some aspects, a version of event position determination module 38 may be downloaded by remote server 36 to each wireless device 12 so that each respective device may locally generate an event record 44 that may provide a ready view of approximated geographic location 200 and/or event information 24 in any form, such as tables, maps, graphics views, plain text, interactive programs or web pages, or any other display or presentation of the data. Further, event record 44 may include any form of output that represents a position related characteristic or parameter, as well as any other related data, associated with the event information from data log 34 of one or more respective wireless devices. In still other aspects, event position determination module 38 may be loaded onto the respective wireless device 12 during the initial assembly process or via serial connections during a configuration process.

Event position determination module 38 may be operable to "pull" the log 34 from a wireless device 12 based on commands from a user, or the logs may be "pushed" from wireless device 12 at predetermined times or upon reaching predetermined memory/data storage levels for assisting in determining approximate location 200 based on geographic fix information.

Figure 7:
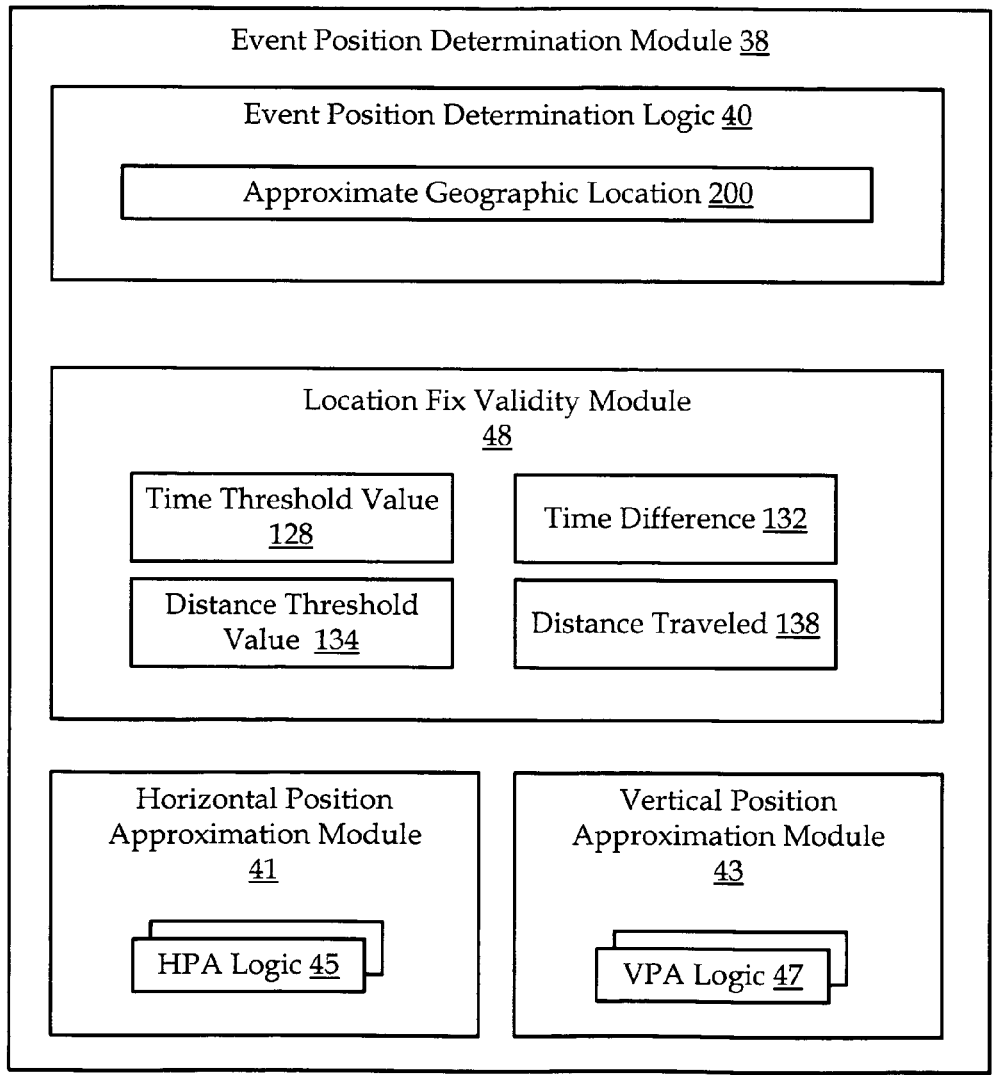
FIG. 7 is a block diagram of one aspect of the event position determination module on the remote server of FIG. 1.

Referring to FIG. 7, in some aspects, event position determination module 38 may include event position determination logic 40 executable by processing engine 42 to manage and perform the functionality of module 38. Event position determination module 38 may further include one or any combination of software, hardware, firmware and generally any executable instructions operable by one or more processors resident on, or remote from, remote server 36. Event position determination logic 40 may include one or a plurality of predetermined relationships to analyze location fix information 20 and generate an approximate geographic location 200 of a detected event 26.

In some aspects, event position determination module 38 may include a location fix validity module 48 operable to validate the location fix information 28 stored within data log 34. Location fix validity module 48 may include location fix validity logic 49 operable to validate a given set of location fix information 28, such as location fix information 106 for $G_1$ 208 and/or location fix information 114 for $G_2$ 224, prior to determining $AL_1$ 238 and/or $AL_2$ 246.

The determined validity associated with any portion of the location fix information 28 may be based on configurable parameters that attempt to measure or gauge the accuracy of determining approximate location 200 from the given portion of the fix information 28. In some aspects, for example, location fix validity module 48 may include a time threshold value 128 that may be used to determine whether or not specific location fix information 28 is close enough to the event 26 in a time domain to be used to determine approximate location 200 of the event 26. In one aspect, location fix validity logic 49 may command processing engine 42 to compare time threshold 128 to a fix/event time difference 132 to determine if location fix information 28 is valid. In one aspect, time difference 132 may be calculated as the amount of time between the event 26 the geographic fix information, for example, based upon timestamp 98 of the event 26 and a timestamp of the respective geographic fix, i.e., $G_1\_ts$ 262 or $G_2\_ts$ 264.

In some aspects, for example, time threshold 128 may correspond to a desired maximum amount of time between the time of the geographic location fix and the time of the event 26 for which the fix is considered to be valid. Time threshold 128 may vary depending on the situation. For instance, a first scenario, where it is known that the wireless device is moving at a relatively fast speed, may have a smaller time threshold 128 than a second scenario where it is known that the wireless device is moving at a relatively slow speed, i.e. a speed slower than the first scenario speed.

In other aspects, for example, location fix validity module 48 may include a distance threshold value 134 that may be used to determine whether or not specific location fix information 28 is close enough to the event 26 in a distance domain to be used to determine an approximate geographic location 200 of the event 26. The distance threshold value 134 may be used in addition, or as an alternative, to determining that the time difference 132 is within the time threshold 128. Distance threshold value 134 may represent a desired maximum distance between the location of the geographic location fix and the location of event 26 for which the geographic location fix is to be considered valid. Distance threshold value 134 may vary depending on the situation. For instance, a first scenario where a user of these apparatus and methods desires a very accurate geographic position to associate with the event may have a smaller distance threshold value 134 than a second scenario where the user requires a less accurate geographic position, i.e. a position that may be further away from the actual event position when compared to the associated position in the first scenario.

In some aspects, location fix validity logic 49 may calculate a distance traveled 138 based on time difference 132 associated with a location fix information 28 and a wireless device horizontal velocity associated with the fix information, such as $G_1\_hv$ (212) or $G_2\_hv$ (226) associated, respectively, with first geographic position $G_1$ (208) or second geographic position $G_2$ (224), as retrieved from data log 34. Further, location fix validity logic 49 may be operable to command processing engine 42 to compare distance traveled 138 to distance threshold value 134 to determine if location fix information 28 is valid based upon satisfying distance threshold condition 124.

It should be noted that time threshold value 128 and distance threshold value 134, either individually or in any combination, may be set as default values, or they may be configurable by a user of system 10. Furthermore, other aspects may include additional threshold settings that may affect the determined validity of location fix information, such as a maximum speed threshold, etc.

Further, time threshold value 128 and distance threshold value 134 can each vary depending on the scenario being tested, the environment associated with the test scenario, the type of wireless device, the type of wireless network components, the type of wireless communications protocol, the type of and retrieval speed of the particular service providing the location fix information, as well as other subjective factors, such as a desired relative accuracy or granularity of the approximated or associated geographic position.

In one non-limiting example, for instance, one test scenario involved call drops by CDMA-based cellular telephones in an urban area. In this example, hundreds of sets of data were analyzed, including the call drop event and the location fix information, and it was determined that most of the valid fixes were obtained within 120 seconds of the call drop event, and based on a marketing analysis, an accuracy of 2000 feet was desired. Further, since this test scenario occurred in an urban area close to a highway, a maximum speed of 65 miles per hour was expected. Thus, in this one example, time threshold value 128 was set at 120 seconds, distance threshold value 134 was set at 2000 feet, and a maximum speed was set at 65 miles/hour. It should be stressed, however, that this is just one non-limiting example, and that each of these thresholds may vary dramatically depending on the many factors discussed above.

Thus, in some aspects, based upon horizontal velocity information and time and distance validation by location fix validity module 48, event position determination module 38 may be operable to utilize at least portions of one or both location fix information records 106 and 114, respectively, to determine the approximate geographic location L 200 of the detected event 26.

In some aspects, for example, event position determination module 38 may include additional modules operable to aid in determining approximate location 200 of detected event 26. For example, event position determination module 38 may include a horizontal position approximation module 41 and a vertical position approximation module 43 operable to determine approximate horizontal and vertical locations, respectively, of the detected event based on a given set of location fix information 28 associated with the event 26.

Figure 8:
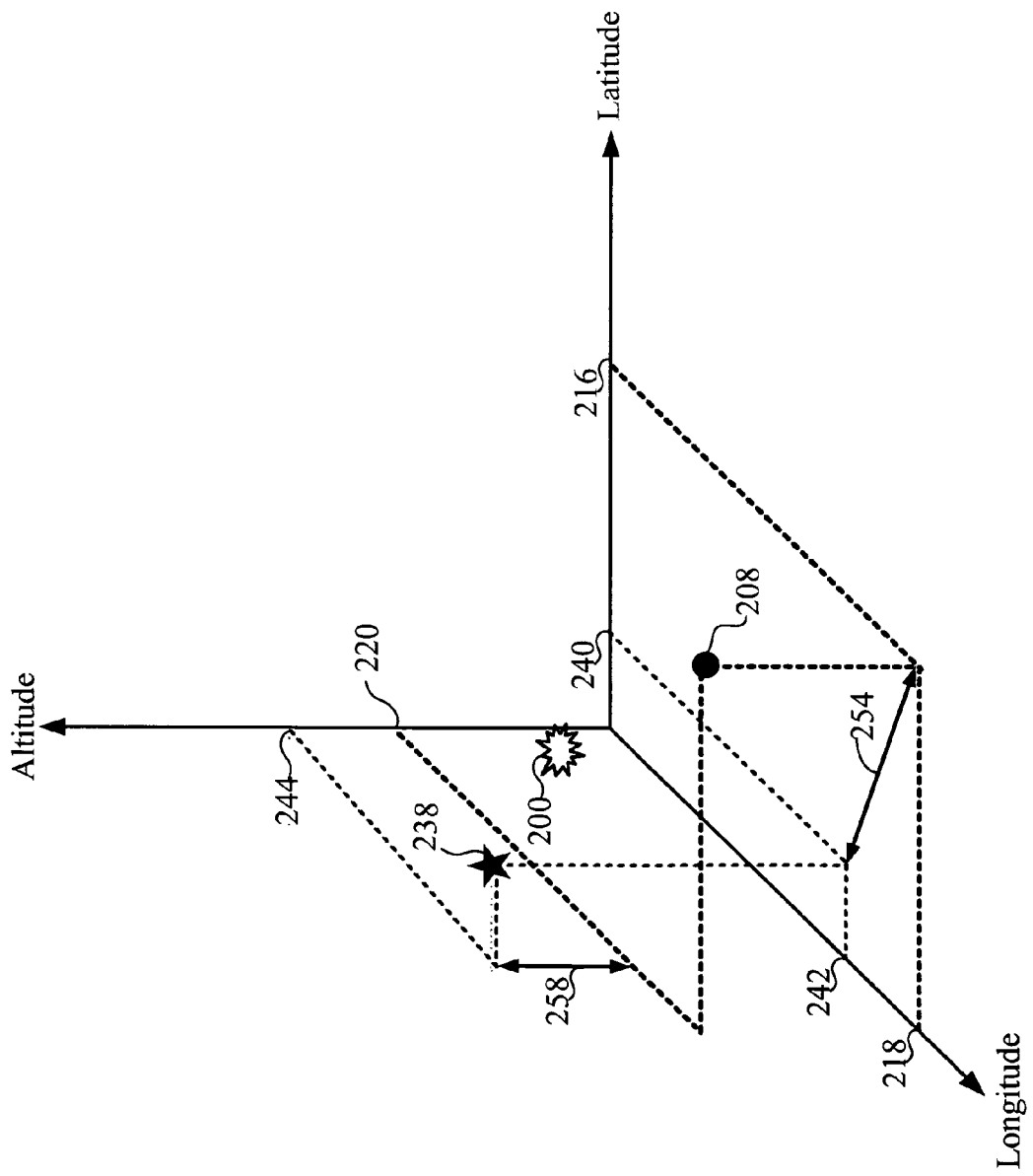
FIG. 8 is a graph of one aspect of a relationship between a first approximate location of the detected event based on the first geographic fix of FIG. 5.
Figure 9:
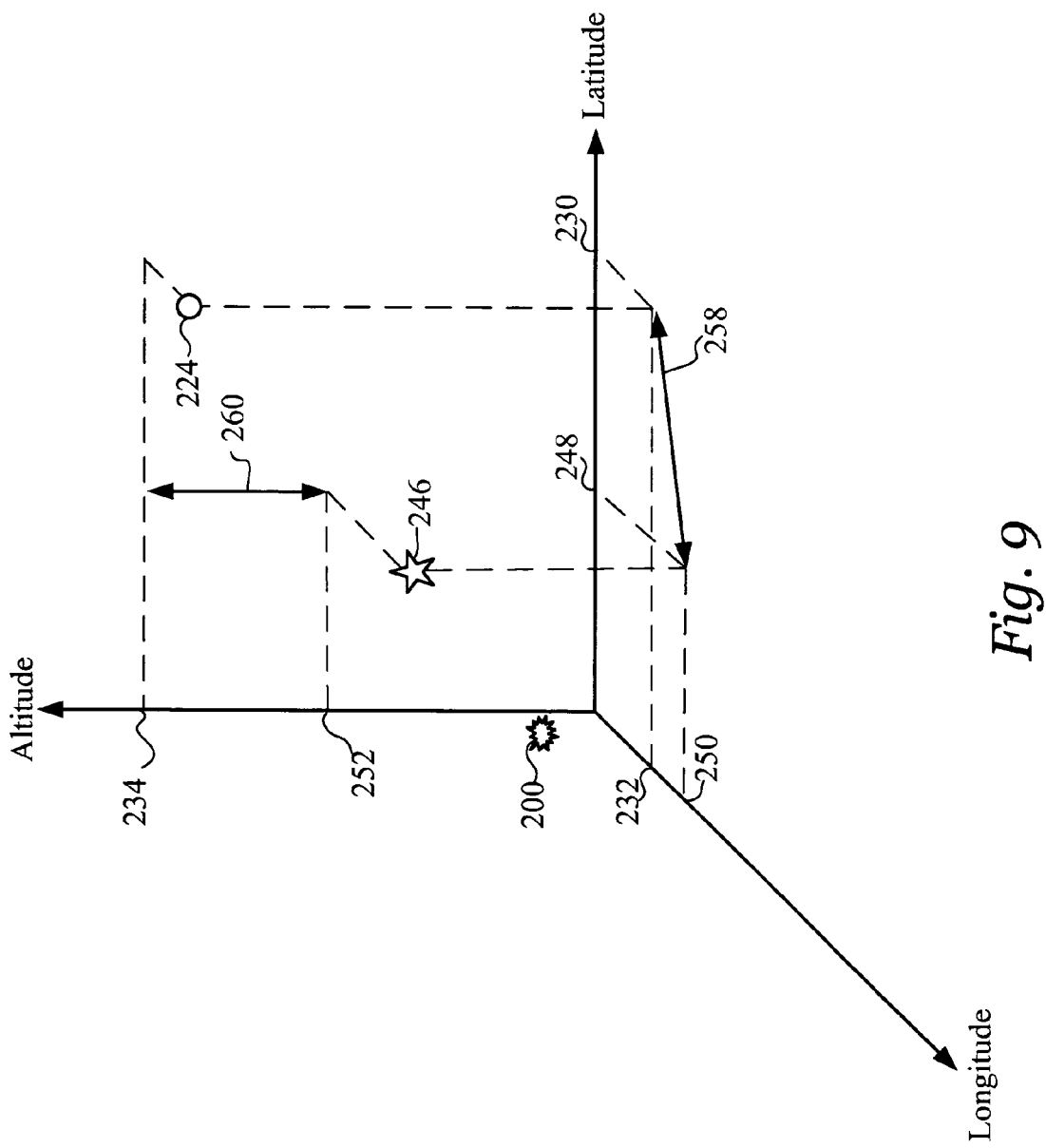
FIG. 9 is a graph of one aspect of a relationship between a second approximate location of the detected event based on the second geographic fix of FIG. 5.
Figure 10:
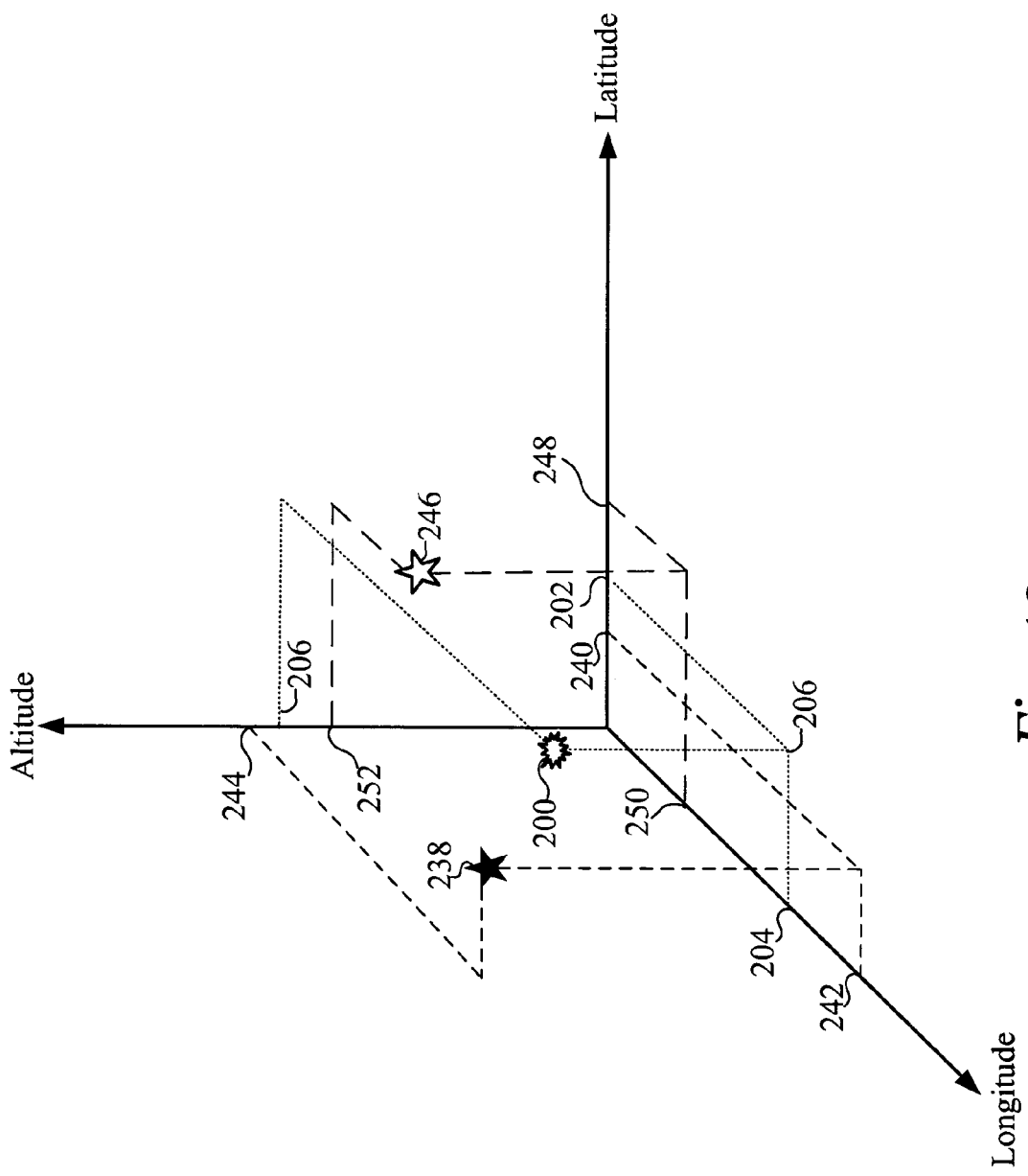
FIG. 10 is a graph of one aspect of a relationship between the first approximate location of FIG. 8 and the second approximate location of FIG. 9 with respect to the geographic location of the predetermined event of FIG. 5.

For instance, referring additionally to FIGS. 8-10, utilizing horizontal position approximation module 41 and vertical position approximation module 43, event position determination logic 40 may be operable to determine a first approximate location ($AL_1$) 238 of the detected event 26 based on the location fix information 106 for $G_1$ 208, and a second approximate location ($AL_2$) 246 of the detected event 26 based on the location fix information 114 for $G_2$ 224. Further, in some cases, event position determination module 38 may be operable to utilize the first approximate location ($AL_1$) 238 of the detected event 26 or the second approximate location ($AL_2$) 246 of the detected event 26 as approximate event geographic location 200. Alternatively, in other cases, event position determination module 38 may be operable determine approximate event geographic location 200 based on the first approximate location ($AL_1$) 238 and/or the second approximate location ($AL_2$) 246 of the detected event 26. Event position determination module 38 may utilize one or both of the above-stated cases depending on the validity and relative weighting of data within one and/or both sets of fix information 106 and 114.

Thus, although geographic fix $G_1$ 208 and/or $G_2$ 224 may be separated in both time and space from the detected event 26, it is possible to derive an approximate geographic position L 200 of the event 26 based upon location fix information of $G_1$ and/or $G_2$.

For example, referring to FIG. 8, an approximate location ($AL_1$) 238 of the detected event L 200 may be determined based upon the first set of location fix information 106 of geographic fix $G_1$ 208 and a timestamp 98 of the detected event L. In some aspects, an altitude ($AL_1\_alt$) 244 of $AL_1$ 238 may be determined by calculating a vertical distance (Vd1) 258 traveled by the wireless device 12 between the timestamp ($G_1\_ts$) 262 (see FIG. 4) of fix G1 208 and the timestamp 98 of the detected event at a vertical velocity ($G_1\_vv$) 214. In other aspects, the longitude ($AL_1\_lon$) 242 and/or the latitude ($AL_1\_lat$) 240 of the approximate location $AL_1$ 238 of the detected event may be determined by calculating a horizontal distance ($HD_1$) 254 traveled by wireless device 12, based on the horizontal velocity ($G_1\_hv$) 212 (see FIG. 4), the bearing of ($G_1\_\theta$) 222, and the time difference 132 between the timestamp ($G_1\_ts$) 262 of fix $G_1$ 208 and the timestamp 98 of the detected event.

In a similar manner, referring to FIG. 9, an approximate location ($AL_2$) 246 of the detected event L 200 may be determined based upon the second set of location fix information 114 of geographic fix $G_2$ 224 and a timestamp 98 of the detected event. In some aspects, an altitude ($AL_2\_alt$) 252 of $AL_2$ 246 may be determined by calculating a vertical distance (Vd2) 260 traveled by the wireless device 12 between the timestamp ($G_2\_ts$) 262 (see FIG. 4) of fix G2 224 and the timestamp 98 of the detected event at a vertical velocity ($G_2\_vv$) 228. In other aspects, the longitude ($AL_2\_lon$) 250 and/or the latitude ($AL_2\_lat$) 248 of the approximate location $AL_2$ 246 of the event L 200 may be determined by calculating a horizontal distance ($HD_2$) 258 traveled by wireless device 12, based on the horizontal velocity ($G_2\_hv$) 226 (see FIG. 4), the bearing of ($G_2\_\theta$) 236, and the time difference 132 between the timestamp ($G_2\_ts$) 264 of fix $G_2$ 224 and the timestamp 98 of the detected event.

In some aspects, referring to FIG. 10, one or both of $AL_1$ 238 and $AL_2$ 246 and/or their corresponding location fix information 106 and/or 114 may be utilized to determine approximate geographic location L 200 of the detected event 26. In this case, at least one of event position determination module 38, horizontal position approximation module 41 and vertical position approximation module 43 may include logic for taking into account the content, validity and/or relative weighting of $AL_1$ 238 and $AL_2$ 246 and/or their corresponding location fix information 106 and/or 114, and for then generating the approximate geographic position L 200 of the corresponding detected event 26. The approximate geographic position L 200 of detected event 26 may include, may be derived from, and/or may allow the derivation of, one or any combination of a latitude (L_lat) 202, a longitude (L_lon) 204, and an altitude (L_alt) 244.

With regard to the content of the location fix information 28, for example, a particular set of location fix information, such as 106 for $G_1$, and/or 114 for $G_2$, may be lacking one or more location-related parameters. For example, a horizontal velocity component, such as the horizontal velocity ($G_1\_hv$) 212 and/or the bearing ($G_1\_\theta$) 222, may be missing. In another example, a vertical velocity component, such as the vertical velocity ($G_1\_vv$) 214 and/or the altitude ($G_1\_alt$) 220, may be missing. Accordingly, in some aspects, horizontal position approximation module 41 (FIG. 7) and vertical position approximation module 43 (FIG. 7), under control of their own logic and/or event position determination logic 40, may each comprise multiple implementations of horizontal and vertical position approximation logic, 45 and 47, respectively, to generate all or at least a portion of approximate geographic position L 200 depending upon the availability and/or determined validity of specific location-related parameters.

Figure 11:
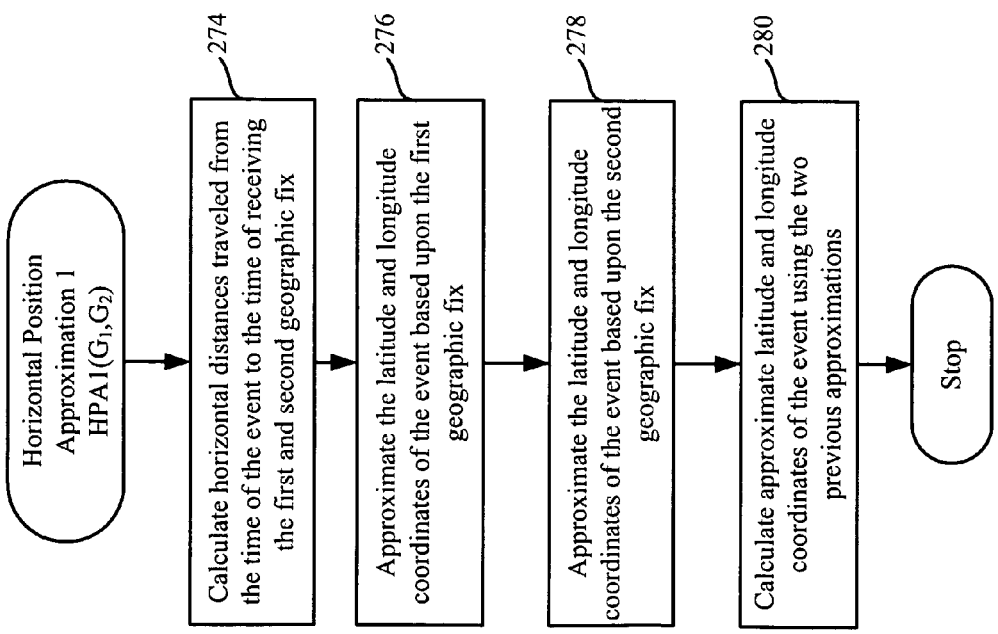
FIG. 11 is a flowchart of one aspect of a method of approximating a horizontal position of an event occurring on a wireless device according to the system of FIG. 1.

For example, referring to FIG. 11, a first implementation, HPA1, may approximate horizontal coordinates, i.e., latitude (L_lat) 202, and longitude (L_lon) 204, of an event 26, when both speed and bearing information are available for both geographic fix $G_1$ and $G_2$. On the other hand, referring to FIG. 12, a second implementation, HPA2, utilizes speed and bearing data from only one set of location fix information. Both HPA1 and HPA2 incorporate predetermined relationships, such as trigonometric relationships utilizing vector information that includes a speed parameter ($G_1\_hv$) 212 and a bearing parameter ($G_2\_\theta$) 222, to provide an approximation of the horizontal location of the event.

For example, in one non-limiting aspect, the first horizontal approximation formula (HPA1) of FIG. 11 may include calculating, at step 274, horizontal distances, $Hd_1$ 254 and $Hd_2$ 256, traveled from the time (Ets) 98 of the event to the time of receiving the first and second geographic fix, $G_1$ and $G_2$, as follows:

$$Hd_1 = (G_1\_hv)*(Ets - G_1\_ts)$$

$$Hd_2 = (G_1\_hv)*(Ets - G_2\_ts)$$

At step 276, longitude and latitude coordinates of first approximate location ($AL_1$) of event 200 based upon the first geographic fix $G_1$ are calculated. Non-limiting, some embodiments may take into account the curvature of the earth, according to the formulas:

$$AL_1\_lat = \arcsin[\sin(G_1\_lat)*\cos(Hd_1) + \cos(G_1\_lat)*\sin(Hd_1)*\cos(G_1\_\theta)]$$

$$dLon_1 = \arctan 2([\sin(G_1\_\theta)*\sin(Hd_1)\cos(G_1\_lat)],$$

$$[\cos(Hd_1) - \sin(G_1\_lat)*\sin(AL_1\_lat)])$$

$$AL_1\_lon = \mod(G_1\_lon - dLon_1 + \pi, 0.2*\pi) - \pi$$

At step 278, longitude and latitude coordinates, $AL_2\_lon$ and $AL_2\_lat$, respectively, of second approximate location ($AL_2$) of the event 26, based upon the second geographic fix $G_2$, may be calculated in a manner similar to step 276, as follows:

$$AL_2\_lat = \arcsin[\sin(G_2\_lat)*\cos(Hd_2) + \cos(G_2\_lat)*\sin(Hd_2)*\cos(G_2\_\theta)]$$

$$dLon_2 = \arctan 2([\sin(G_{2\_\theta)*\sin(}Hd_2)\cos(G_2\_lat)],$$

$$[\cos(Hd_2) - \sin(G_2\_lat)*\sin(AL_2\_lat)])$$

$$AL_2\_lon = \mod(G_2\_lon - dLon_2 + \pi, 2*\pi) - \pi$$

At step 280, the approximate latitude (L_lat) 202 and longitude (L_lon) 204 of the approximate geographic location 200 of the event 26 are calculated. If distances $Hd_1$ and $Hd_2$ are equal, then the latitude and longitude of the event 26 may be determined using the approximations calculated using the location fix information of the second fix $G_2$, as follows:

$$L\_Lat = AL_2\_lat$$

$$L\_Lon = AL_2\_lon$$

However, if the distances $Hd_1$ and $Hd_2$ are different, the approximate latitude and longitude of the location of the event 26 may be determined using a weighted average of both distances, as follows:

$$L\_Lat = \left[\frac{(|HD_1|*AL_2\_lat) + (|HD_2|*AL_1\_lat)}{|HD_1|+|HD_2|}\right]$$

$$L\_Lon = \left[\frac{(|HD_1|*AL_2\_lon) + (|HD_2|*AL_1\_lon)}{|HD_1|+|HD_2|}\right]$$

The absolute values of the distances, illustrated in the equations above, are used to take into account the fact that one of the distances may be negative. For example, $Hd_2$ may be negative because the timestamp ($G_2\_ts$) of the second geographic fix $G_2$ is later than the timestamp (Ets) of the event 26.

Further, it should be noted that the above weighted average equations have been simplified to ignore the curvature of the earth, based on the assumption that the distances will be relatively small. Other equations may be utilized, however, to take into account the curvature of the earth.

Figure 12:
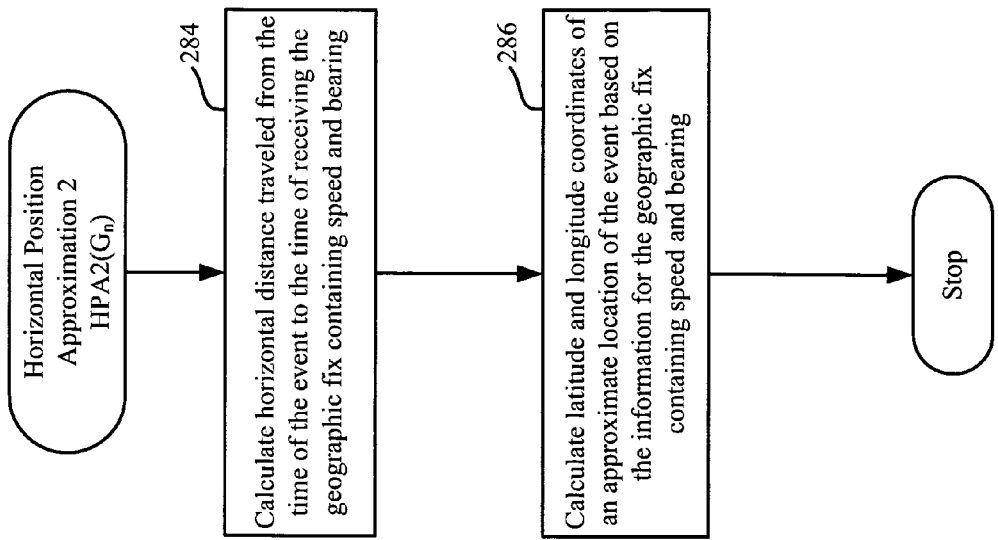
FIG. 12 is a flowchart of another aspect of a method of approximating a horizontal position of an event occurring on a wireless device according to the system of FIG. 1.

Referring to FIG. 12, a second horizontal position approximation (HPA2) may be utilized to approximate the latitude and longitude coordinate of the detected event when only one set of location fix information is available or is determined to be valid for a particular geographic fix, $G_n$. For example, one geographic fix may be ruled invalid because the time difference 132 between the event and the fix exceeds the predetermined time threshold 128, and/or the distance traveled 138 is greater than the predetermined distance threshold 134. In another example, horizontal information, i.e., horizontal speed and bearing information may not be available for either of geographic fixes $G_1$ or $G_2$. This second example may occur, for example, when the wireless device is no longer operable after the event 26 and is incapable of receiving, or forwarding, location fix information for geographic fix $G_2$.

Accordingly, at step 284 in FIG. 12, a horizontal distance, Hd, traveled from the time of the event 26 to the time of receiving a geographic fix $G_n$ is calculated, wherein $G_n$ is the geographic fix, e.g., $G_1$ or $G_2$, that comprises the horizontal velocity information. This step is similar to that of step 274 (FIG. 11), for only one of $G_1$ and $G_2$, i.e., $G_n$. As such, Hd may be calculated as:

$$Hd = (G_n\_hv)*(Ets - G_n\_ts)$$

Similar to steps 274 or 276 of FIG. 11, at step 286, longitude and latitude coordinates, AL_lon and AL_lat, respectively, of the approximate location (AL) of the event 26 are calculated according to the formulas:

$$AL\_lat = \arcsin[\sin(G_n\_lat)*\cos(Hd) + \cos(G_n\_lat)*\sin(Hd)*\cos(G_n\_\theta)]$$

$$dLon = \arctan 2[((\sin(G_n\_\theta)*\sin(Hd)*\cos(G_n\_lat)),$$

$$(\cos(Hd) - \sin(G_n\_lat)*\sin(AL\_lat))]$$

$$AL\_lon = \mod[(G_n\_lon - dLon + \pi), 2*\pi] - \pi$$

At step 288, the latitude and longitude coordinates of the event are assigned to be the approximate latitude AL_lat and longitude AL_lon calculated above, as follows:

$$L\_lat = AL\_lat$$

$$L\_lon = AL\_lon$$

In other aspects, when horizontal velocity information is not available, an alternate method of determining approximate geographic location 200 of the detected event 26 may comprise comparing the time difference between the event time and the respective location fix information and, for example, selecting as the approximate geographic location 200 the geographic location of the fix having the smallest time difference. Further details of methods and apparatus for performing such a determination may be found in U.S. patent application Ser. No. 11/139,301, entitled "Apparatus and Methods for Associating a Geographical Position with an Event Occurring on a Wireless Device," filed May 27, 2005, assigned to the assignee hereof and hereby incorporated by reference in its entirety.

Similar to the methods employed for approximating a horizontal position of an event 26, referring to FIGS. 13 and 14, two alternative methods, VPA1 and VPA2, respectively, may be utilized by vertical approximation module 43 for approximating an altitude ($L_{13}$ alt) 206 of the geographic position (L) 200 of an event 26.

For example, referring to FIG. 13, in some aspects, the method of VPA1 may be based upon a determination by location fix validity module 48 that geographic fixes $G_1$ and $G_2$ both contain valid location-related parameters. Accordingly, altitude and vertical velocity information present in location fix information 106 and 114 may be used to approximate the altitude of event 200.

At step 294, vertical distances, $Vd_1$ and $Vd_2$, traveled from the timestamp (Ets) of the event to the time of receiving the first and the second geographic fix may be calculated as:

$$Vd_1 = (G_1\_vv)*(Ets - G_1\_ts)$$

$$Vd_2 = (G_2\_vv)*(Ets - G_2\_ts)$$

$Vd_1$ and $Vd_2$ may be a positive or negative distance based upon whether the event occurred before or after the geographic fix.

At step 296, a first approximate altitude ($AL_1\_alt$) based upon the location fix information for geographic fix $G_1$, and a second approximate altitude ($AL_2\_alt$) based upon the location fix information for geographic fix $G_2$, may then be calculated as:

$$AL_1\_alt = G_1\_alt + Vd_1$$

$$AL_2\_alt = G_2\_alt + Vd_2$$

Similar to either the latitude or longitude calculations of HPA1, if the absolute value of $Vd_1$, is equal to the absolute value of $Vd_2$, in some aspects of method VPA1, the approximate altitude (L_alt) of the event 26 may be set as:

$$L\_alt = AL_2\_alt$$

based upon the assumption that the later geographic fix, $G_2$, is more accurate than the earlier fix $G_1$ as it is triggered based upon the detection of the event 26 and may therefore be closer in time and space to the event 26.

In this aspect, in the event that the absolute value of $Vd_1$ is not equal to the absolute value of $Vd_2$, the approximate altitude of event 200 may be set to the weighted average of the calculated vertical distance traveled between the time of geographic fix $G_1$ and the time of the event 26, and the calculated vertical distance traveled between the time of the event 26 and the time of geographic fix $G_2$, for example, based on the formula:

$$L\_alt = \left[\frac{(|Vd_1| * AL_2\_alt) + (|Vd_2| * AL_1\_alt)}{|Vd_1| + |Vd_2|}\right].$$

Furthermore, similar to the horizontal location approximation method HPA2, vertical velocity information may be available, or valid, for only one geographic fix $G_n$. Referring now to FIG. 14, in some aspects, the vertical position approximation method VPA2 allows the event altitude (L_alt) to be approximated from altitude ($G_n$_alt) and vertical velocity information ($G_n$_vv) available from the single valid location fix, $G_1$ or $G_2$.

The vertical distance Vd traveled from the time of the event to the time ($G_n$_ts) of receiving the one location fix $G_n$ may be calculated as:

$$Vd = (G_n\_vv) * (Ets - G_n ts)$$

The altitude of an approximate location of the event 26, based upon the information from the fix $G_n$ containing altitude and vertical velocity information may be calculated as:

$$AL\_alt = G_n\_alt + Vd$$

Accordingly, because location fix information from only one geographic fix is used, the approximate altitude of the event may be set as follows:

$$L\_alt = AL\_alt$$

In some aspects, event position determination logic 40 is operable to select an approximation implementation, e.g., HPA1, HPA2, VPA1 and/or VPA2, in a predetermined manner based upon the availably of horizontal velocity information and the availability of vertical velocity information present in the location fix information 28, as well as based on the validity of that data as determined by location fix validity logic 48.

Non-limiting, for the purpose of approximating a location of a detected event on a wireless device 12, the event position determination logic 40 is operable to categorize various combinations of location fix information for $G_1$ and $G_2$ into "cases," depending upon the availability of horizontal and vertical velocity information, and depending upon those categories an approximation implementation, such as HPA1, HPA2, VPA1, VPA2 and/or some other predetermined function for approximating location coordinates, may be selected.

For example, a "Case 1" may be defined wherein the time difference between the event 26 and the location fix time, $G_1$_ts, and between the event 26 and the location fix time $G_2$_ts, is within time threshold 128 and horizontal velocity information, i.e., speed and bearing, is provided in both location fix information records, 106 and 114. A "Case 2" may be defined in which the horizontal velocity is available in only one, but not both, of location fix information record, i.e., 106 or 114. The cases defined above are non-limiting. Other cases may exist and may employ alternate methods to approximate the geographic position of a detected event 26.

FIGS. 15-18 illustrate one possible set of methods to approximate the location of a detected event that occurred on a wireless device 12.

Figure 15:
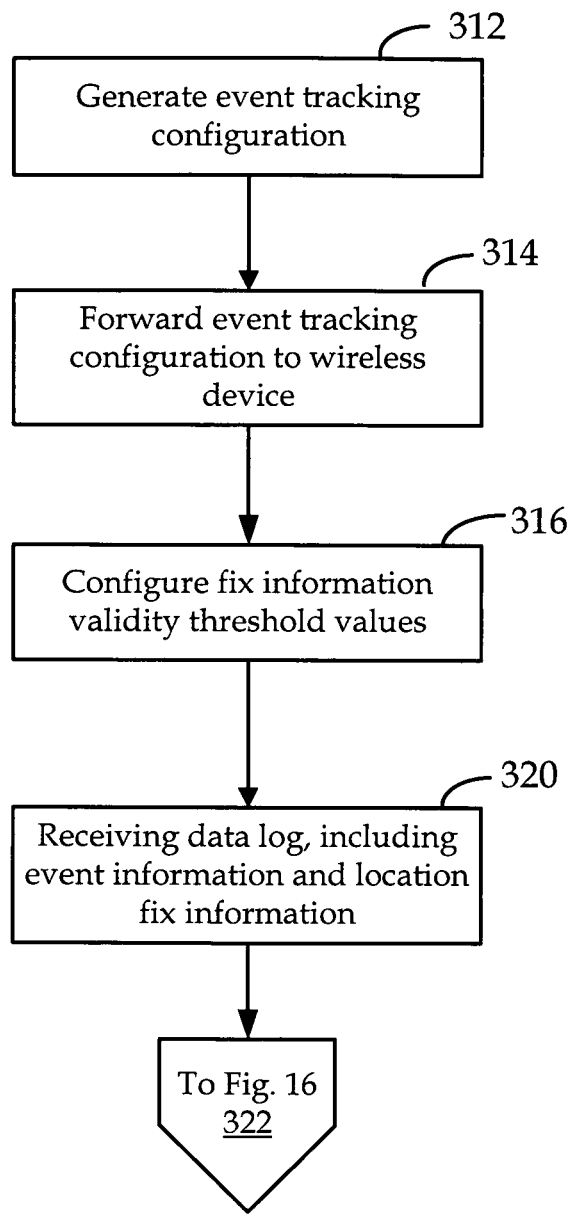
FIGS. 15-17 are flowcharts of one aspect of a method executed on an apparatus for approximating a location of an event occurring on a wireless device according to the system of FIG. 1.

Referring to FIG. 15, at step 312, the method may include generating an event tracking configuration 92 in order to identify a predetermined event occurring on a wireless device 12. For example, the event tracking configuration 92 may include one or more event tracking parameters entered locally or remotely into remote server 36 by a user. For example, the event tracking parameters may identify, among other things, one or more predetermined events to monitor, what information to record relating to a detected event, and when and to whom to provide with the recorded information.

Further, at step 314, the method may optionally include forwarding the event tracking configuration 92 to a respective wireless device 12. For example, remote server 36 may transmit the configuration 92 across a wireless network 32 to wireless device 12. These actions may be initiated, for example, by a technician, field service engineer or any other operator of remote server 36. Alternatively, the configuration 92 may be loaded on the wireless device via a wired connection to the wireless device, or may be statically loaded at the time of manufacture.

Based upon executing the received event tracking configuration 92 and event tracking logic 20, wireless device 12 is operable to detect the occurrence of a predetermined event 26 and transmit specific information, i.e., event information 24 and location fix information 28, associated with the event 26 to another device, such as remote server 36, for analysis.

Furthermore, the wireless device 12 is configurable to request, receive, store and transmit location fix information 28 to remote server 36. For example, event tracking module 20 may be operable to generate a request for position information and transmit the request to location module 22. The location module 22 may, via location retrieval logic 100, retrieve location-related information from a position determination entity 30 across the network 32 and store the received data as location fix information 28 in wireless memory resident data log 34.

In some aspects, event tracking module 20 and location module 22 are executable by communications processing engine 82 of the respective wireless device 12 to collect event information 24 and location fix information 28 in data log 34, such as based on configuration 92 and the detection of a predetermined event 26.

At step 316, the method may include configuring validity thresholds to apply to location fix information. For example, this action may include setting time and distance threshold values, i.e., time threshold value 128 and distance threshold value 134, to be used for validating location fix information. The threshold values may be utilized to determine if the data received is sufficiently reliable so as to be used to approximate the location of a detected event. For example, a location fix validity module may comprise a predetermined time threshold value 128 and a predetermined distance threshold value 134 which may be entered into event position determination module 38 by an operator of remote server 36 or may be received from another device either directly connected to remote server 36 or remotely connected via network interface 52.

Upon being configured to detect an event occurring on the wireless device, an event tracking module 20 may, upon detecting an event, generate a log 34 of the event, and transmit the log 34 across network 32.

Subsequently, at step 320, the method may include receiving and storing one or more data logs 34 from one or more wireless devices 12. For example, remote server 36 may receive the data logs for the wireless device to which it forwarded the tracking configuration. Upon receipt of data log 34, the method may continue processing at step 322 in FIG. 16.

Figure 16:
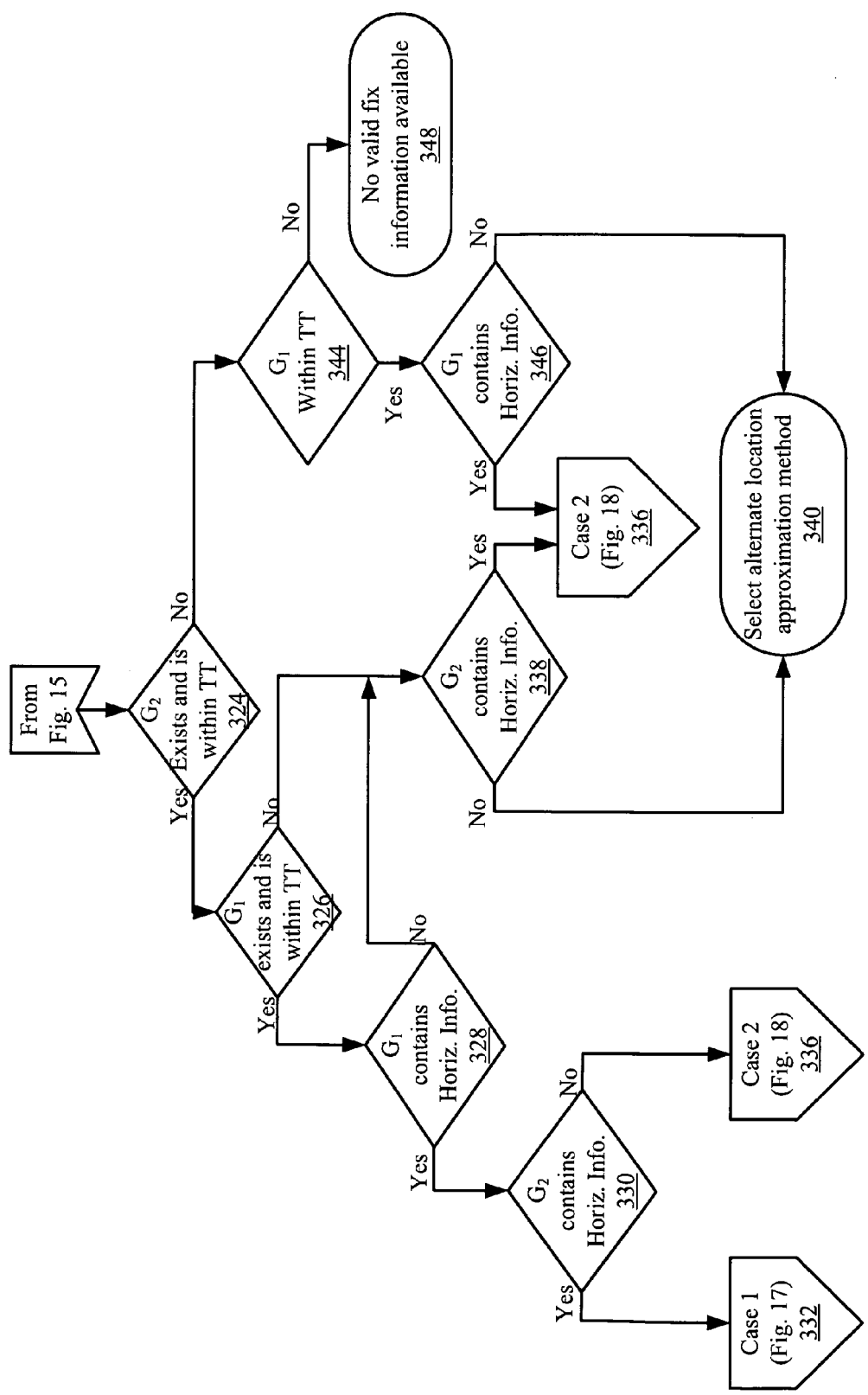

Referring now to FIG. 16, after receiving the data log 34 at step 322, the method may include determining whether $G_1$ and/or $G_2$ occur within a predetermined time threshold 128 of the detected event 26. Furthermore, in some aspects, the method may determine whether $G_1$ and/or $G_2$ comprise horizontal velocity information, i.e., horizontal velocity and bearing information, to determine an approximate location for event 26. In some aspects, event position determination logic 40 may first calculate a time difference 132, between the event time (ETs) 98 and the location fix time in the data log 34 to be used in validating the location-related data.

Non-limiting, the method may test $G_2$ prior to testing $G_1$. In this case, at step 324, the method may include determining whether geographic fix $G_2$ has occurred within the time threshold 128. For example, event position determination logic 40 may compare time difference 132 to time threshold 128 to determine whether $G_2$ is valid.

If $G_2$ is within time threshold 128, control may pass to step 326, at which point the method may include testing the location fix information for the other geographic fix, $G_1$. That is, event position determination logic 40 may be operable to determine whether $G_1$ occurred within time threshold 128 in a similar manner to that performed in regard to $G_2$.

If event position determination logic 40 determines that $G_1$ is invalid because it occurred outside of time threshold 128, at step 338, the method may test $G_2$ for horizontal velocity information in order to determine whether $G_2$, by itself, may be used to approximate a position of the event 26.

However, if both $G_1$ and $G_2$ occurred within time threshold 128, the method may continue processing at steps 328 and 330 to test whether neither, one or both of $G_1$ and $G_2$ comprise horizontal information, i.e., horizontal velocity and/or bearing information, to approximate the location of the event.

Non-limiting, at step 328, the method may first test $G_1$.

If $G_1$ comprises horizontal information, at step 330 the method may test $G_2$ to determine if both $G_1$ and $G_2$ comprise horizontal information.

Alternatively, if $G_1$ does not comprise horizontal information, at step 338, the method may determine if $G_2$ comprises horizontal information.

Figure 17:
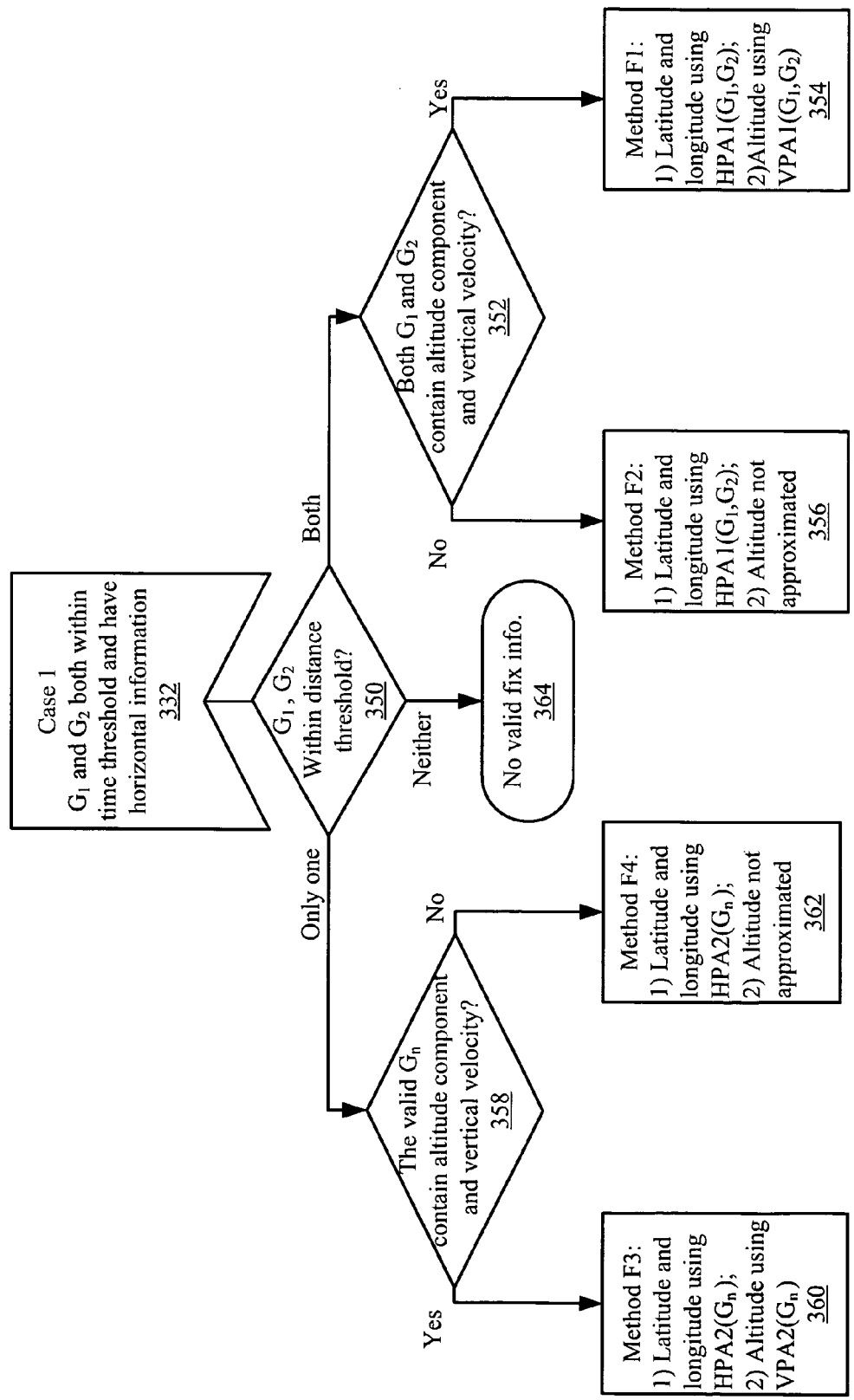

If at step 330 event position determination logic 40 determines that both $G_1$ and $G_2$ comprise horizontal velocity and/or bearing information, i.e., a Case 1 scenario, control may pass to FIG. 17, step 332. Alternatively, if only one of $G_1$ and $G_2$ comprise the required information, i.e., a Case 2 scenario, control may pass from either step 330 or step 338 to FIG. 18, step 336.

Finally, if neither $G_1$ nor $G_2$ comprise horizontal velocity information, then approximating a location of an event 26 occurring on a wireless device 12 may require an alternate event location method at step 340, including, but not limited to, methods disclosed in U.S. patent application Ser. No. 11/139,301 entitled "Apparatus and Methods for Associating a Geographical Position with an Event Occurring on a Wireless Device," filed May 27, 2005, previously incorporated herein by reference in its entirety. For example, in this scenario, a low time threshold method may be utilized wherein the geographic location of the fix information having the minimum time difference with the event time may be used as an approximate location of the detected event. It should be noted, however, that other approximation methods may be utilized.

Referring back to step 324, in the case that event position determination logic 40 determines that the time between event 26 and the time of geographic fix $G_2$ does not meet time threshold 128, the time of geographic fix $G_1$ may be tested at step 344.

If the location fix validity module 48 determines that the time difference 132 associated with the location fix information of geographic fix $G_1$ does not meet the time threshold 128, then the method ends at step 348 as neither set of fix information contains valid parameters based on the configured thresholds.

Alternatively, if the calculated time difference 132 meets the time threshold 128, then the location information of geographic fix $G_1$ may be tested at step 346 to determine whether $G_1$ comprises horizontal velocity and/or bearing information.

If the method determines at step 346 that $G_1$ does not comprise horizontal information, then at step 348 the method may compute an event location based on an alternate method that does not require horizontal information. For example, such an alternate method may include, but is not limited to, the previously mentioned low time threshold method disclosed in U.S. patent application Ser. No. 11/139,301 entitled "Apparatus and Methods for Associating a Geographical Position with an Event Occurring on a Wireless Device," filed May 27, 2005, previously incorporated herein by reference in its entirety.

Figure 18:
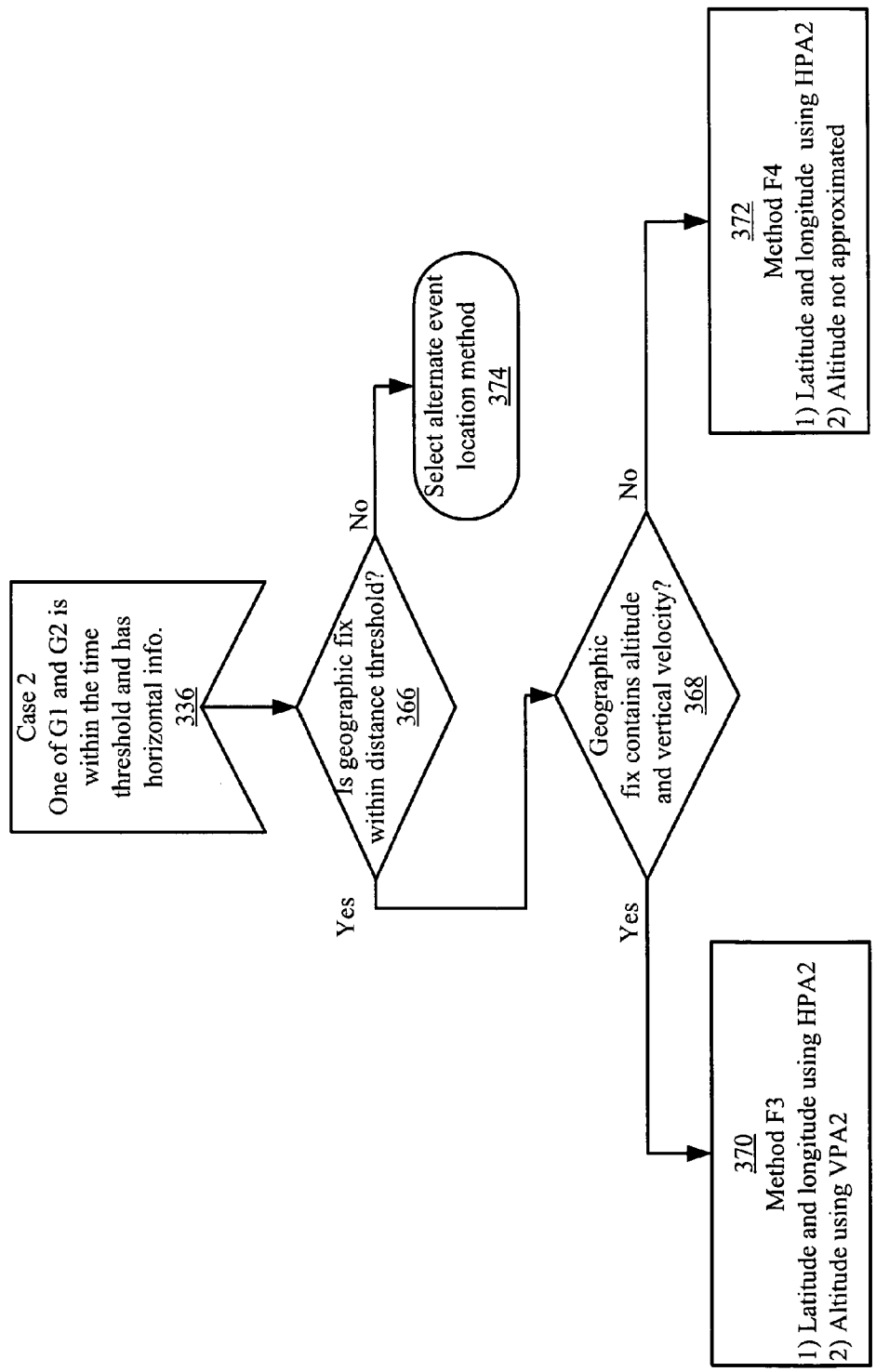

If the event position determination logic 40 determines at step 346 that $G_1$ does comprise horizontal velocity and/or bearing information, an approximate location of event 26 may be determined based upon the location information for one geographic fix, i.e., a Case 2 scenario, and control may pass to FIG. 18, step 336.

As discussed above, the location related data comprising geographic fixes $G_1$ and $G_2$ may be categorized into Case 1 and Case 2 scenarios. FIG. 17 illustrates some aspects of a method, beginning at step 332, for approximating the location of an event occurring on wireless device 12, wherein location fix information 28 for $G_1$ and $G_2$ fall under the conditions warranting the Case 1 analysis. As previously disclosed, Case 1 includes those scenarios in which both $G_1$ and $G_2$ occur within a time threshold 128 of the detected event 26 and both sets of location fix information 106 and 114 comprise horizontal information.

At step 350, location fix validity module 48 may be operable to test whether the location of geographic fixes $G_1$ and $G_2$ are within the distance threshold 134 of the event 26. In some aspects, event position determination logic 40 may determine the horizontal distance traveled, i.e., $Hd_1$ and $Hd_2$ by multiplying the respective time difference 132 by the respective horizontal velocity, i.e., $G_1\_hv$ and $G_2\_hv$.

Still referring to step 350, event position determination logic 40 is then operable to compare the calculated distances, $Hd_1$ and $Hd_2$, with distance threshold 134 to determine whether the respective geographic fix, i.e., $G_1$ and/or $G_2$, was within a predetermined acceptable distance of the detected event 26.

If both distances, $Hd_1$ and $Hd_2$, are within distance threshold 134, control may pass to step 352 where $G_1$ and $G_2$ are then tested by event position determination logic 40 to determine whether they both contain altitude and vertical velocity components, i.e., $G_1\_alt$, $G_2\_alt$, $G_1\_vv$, and $G_2\_vv$.

If $G_1$ and $G_2$ both contain altitude and vertical velocity components, then at step 354 the event position determination logic 40 may invoke a method F1 ($G_1,G_2$) using location fix information 106 and 114 from both $G_1$ and $G_2$ to approximate the horizontal and vertical location of the event 26.

As shown in Table 2, below, Method F1 ($G_1$, $G_2$) uses the HPA1 formula of FIG. 11 to approximate the horizontal position, i.e., L_lat and L_lon, of the event and the VPA1 formula of FIG. 13 to approximate the vertical position, i.e., L_alt, of the event. Non-limiting, the four methods listed in Table 2 are but one of a plurality of possible aspects operable to determine a location 200 of an event 26 of a wireless device based upon scenarios such as Case 1 and Case 2, described above.

TABLE 2

|  | HPA1 | HPA2 |
| --- | --- | --- |
| VPA1 | F1($G_1$, $G_2$) | — |
| VPA2 | — | F3($G_n$) |
| No altitude approximation | F2($G_1$, $G_2$) | F4($G_n$) |

As indicated in Table 2, in some cases the approximate location 200 of event 26 may not include an altitude approximation of the event 26. These cases represent Method F2 and Method F4, as indicated on FIG. 17, steps 356 and 362, respectively, wherein the location related information for data may be valid as per time threshold 128 and distance threshold 134, but may not contain altitude and vertical velocity information.

Referring back to step 352, if at least one of $G_1$ and $G_2$ is lacking altitude or vertical velocity information, then Method F2 ($G_1$, $G_2$) may be invoked at step 356 to approximate the latitude and longitude of the event using formula HPA1 (FIG. 11), but no vertical location approximation method may be invoked, even if vertical information is available from one geographic fix. For example, one reason for not including an approximate vertical location in this instance is that it may be inaccurate and inconsistent to base such an approximation on the vertical information of one fix while using the horizontal information of both fixes to approximate the horizontal location.

Referring back to step 350, if only one of geographic fixes $G_1$ and $G_2$ occur within the distance threshold 134, control may pass to step 358 to test whether an altitude and a vertical velocity component is available for the one geographic fix, i.e., $G_n$, that is within distance threshold 134 of the event.

At step 358, if $G_n$ comprises an altitude component and a vertical velocity component, in one aspect, event position determination logic 40 may utilize Method F3 ($G_n$). Method F3 uses formula HPA2 (FIG. 12) to approximate the longitude and latitude of the event 26, and VPA2 (FIG. 14) to approximate the vertical location of the event 26.

Alternately, at step 358, if the method determines that $G_n$ does not comprise an altitude and a vertical velocity component, then the method proceeds to step 360, which utilizes Method F4 ($G_n$) to approximate the longitude and latitude of the event. Method F4 ($G_n$) may apply formula HPA2 (FIG. 12) to approximate the latitude and longitude of the event 26. No approximation of the altitude is available due to the lack of altitude and vertical velocity information.

FIG. 18 illustrates some aspects of a method, beginning at step 336, for approximating the location of an event 26 in situations where location fix information records 106 ($G_1$) and 114 ($G_2$) satisfy Case 2 conditions, i.e., only one, i.e., $G_n$, of the fixes $G_1$ and $G_2$ satisfies time threshold 128 and comprises horizontal velocity and/or bearing information.

At step 366, event position determination logic 40 and/or location fix validity module 38 may be operable to determine if the single geographic fix, i.e., $G_n$, occurring within time threshold 128 and comprising horizontal velocity information, occurs within distance threshold 134.

If $G_n$ does not occur within distance threshold 134, then an alternate event location method may be applied at step 374. For example, an alternate method may include a method previously disclosed in the previously mentioned U.S. patent application Ser. No. 11/139,301.

Alternatively, if $G_n$ occurs within distance threshold 134, at step 368 the event position determination logic 40 may determine whether or not $G_n$ comprises vertical velocity information, i.e., altitude and/or vertical velocity.

If $G_n$ does contain vertical velocity information, then at step 370 the Method F3 ($G_n$) may be utilized to approximate latitude and longitude coordinates of an event. For example, Method F3 ($G_n$) applies formula VPA2 (FIG. 14) to approximate the corresponding altitude of the event 26.

If $G_n$ does not contain vertical velocity information, then the Method F4 ($G_n$) may be applied at step 372 to approximate latitude and longitude of the event. In some aspects, Method F4 utilizes formula HPA2 (FIG. 12) for the calculation. Because no vertical velocity information is available in this case, then in some aspects, no approximation for the altitude is calculated.

FIGS. 19-22 illustrate different scenarios under which event position determination module 38 (FIG. 7) processes received event information 24 (FIG. 7) and location fix information 28 (FIG. 7) to approximate a location of an event occurring on a wireless device. For all examples shown, the time threshold rule 122 (FIG. 7) is satisfied and the distance threshold 134 (FIG. 7) has yet to be determined.

FIG. 19 may illustrate a first Case 1 example comprising an event location 382, a pre-event geographic fix $G_1$ (388), and a post-event $G_2$ (376), wherein both $G_1$ and $G_2$ contain horizontal information, i.e., latitude, longitude, timing, velocity and bearing, and vertical velocity information, i.e., altitude and vertical velocity. $Hd_1$ (386) is the distance between $G_1$ (388) and $AL_1$ (384), wherein $AL_1$ is an approximated location of event 26 based upon the location related information 28 provided in data log 34. Similarly $Hd_2$ (378) is the distance between $G_2$ (376) and $AL_2$ (380), wherein $AL_2$ is an approximated location of event 26 based upon location related information 114 for geographic fix $G_2$. Furthermore, the location fix information for fixes $G_1$ and $G_2$ are both valid, based upon calculations performed by event position determination logic 40 which determines that both $Hd_1$ (386) and $Hd_2$ (378) are less than distance threshold 134. Applying the flowchart of FIG. 17 (Case 1), an approximate geographic location 382 of the event 26 may be calculated based upon a Method F1 ($G_1$,$G_2$), as indicated in FIG. 17 at step 354, and may include longitude, latitude, and altitude approximations.

Still referring to FIG. 19, a second Case 1 example may comprise all the conditions disclosed in the first example, except that geographic fix $G_1$ (388) may comprise only horizontal information, i.e., geographic fix $G_1$ (388) lacks altitude and vertical velocity information. Under these circumstances, an approximate location of the detected event may be based upon method F2 ($G_1$,$G_2$), as indicated in FIG. 17 at step 356, and may not contain vertical location information.

FIG. 20 may illustrate a third Case 1 example, comprising geographic fix $G_1$ (392) and geographic fix $G_2$ (394), which are evaluated for use in determining approximate geographic location 390 of a detected event. In this case, $G_1$ (392) comprises only horizontal location information and $G_2$ (394) comprises both horizontal and vertical location information. In this case, upon calculating $Hd_1$ (397) and $Hd_2$ (398), event position determination logic 40 may determine that $Hd_1$ (397) is greater than distance threshold 134. Therefore, while horizontal and vertical coordinates of $AL_2$ (396) may be calculated, the horizontal coordinates of an $AL_1$ (not shown) may not be calculated because $G_1$ (392) is considered invalid based on the violation of the distance threshold. Accordingly, the approximate geographic location 390 of the event may be determined based solely upon information associated with geographic fix $G_2$ using Method F3 ($G_2$), as indicated in FIG. 17 at step 360, and may contain an approximate longitude, latitude and altitude of the event.

FIG. 20 may further illustrate a fourth Case 1 example, similar to the third example, differing in that both geographic fix $G_1$ (392) and geographic fix $G_2$ (394) comprise only horizontal information. Accordingly, an approximate altitude of $AL_2$ (396) may not be calculated in this aspect because $G_2$ (394) does not contain vertical information. Furthermore, the approximate location, i.e., longitude and latitude only, of the event may be based upon Method F4 ($G_2$), as indicated in FIG. 17 at step 362.

FIG. 21 may illustrate a fifth Case 1 example, comprising geographic fix $G_1$ (402) and geographic fix $G_2$ (404), which are evaluated for use in determining approximate geographic location 400 of a detected event. In this example, $G_1$ (402) comprises both horizontal and vertical information, while $G_2$ (404) comprises only horizontal information. Further, $Hd_1$ (408) is calculated to be within distance threshold 134, while $Hd_2$ (409) is calculated to be greater than distance threshold 134. Therefore, while horizontal and vertical coordinates of $AL_1$ (406) may be calculated, the horizontal coordinates of an $AL_2$ (not shown) are not calculated because $G_2$ (404) is considered invalid based the violation of the distance threshold. Accordingly, the approximate location of an event occurring between the time stamps of $G_1$ and $G_2$ may be based upon Method F3 ($G_1$), as indicated in FIG. 17 at step 360, and may contain a vertical component based upon location fix information data for $G_1$ (402).

FIG. 21 may further illustrate a sixth Case 1 example, similar to the fifth example, except that $G_1$ (402) comprises only horizontal information while $G_2$ (404) comprises both horizontal and vertical information. Based upon this set of conditions, horizontal coordinates $AL_1$, (406) are calculated based upon of latitude, longitude, and bearing information received concerning $G_1$ (402). Horizontal coordinates of $AL_2$ (not shown), are not calculated because $G_2$ (404) is considered invalid based upon violating the distance threshold. Further, an altitude coordinate for $AL_1$ (406) is not calculated because $G_1$ (402) does not contain vertical velocity information. Accordingly, the approximate location of the event may be based upon Method F4 ($G_1$), as indicated in FIG. 17 at step 362, and does not contain a vertical component.

FIG. 22 may illustrate a first Case 2 example in which a single geographic fix $G_n$ (418) comprises both horizontal and vertical information. Based upon the information present in this example, event position determination logic 40 may determine that horizontal distance Hd (416) is within a threshold determined by distance threshold 134. Horizontal and vertical coordinates of an approximate location AL (412) of the event 410 may be calculated based upon horizontal information, i.e., latitude, longitude and bearing information, and vertical velocity information relative to geographic fix $G_n$ (418). Accordingly, the approximate location of an event may be determined based upon Method F3 ($G_n$), as indicated in FIG. 17 at step 370, and may contain a vertical component, i.e., altitude, based upon a single geographic fix $G_n$ (418).

FIG. 22 may illustrate a second Case 2 example, wherein $G_n$ (418) comprises only horizontal information, while the other parameters of the first Case 2 example remain the same. Under these conditions, the vertical component of an approximate location AL (412) of the event may not be calculated because $G_n$ (418) does not contain vertical information. Further, because the information from only a single fix can be utilized, and because this information does not include vertical information, the approximate geographic location of the detected event only includes longitude and latitude coordinates set to AL (412), which may be calculated based upon Method F4 ($G_n$).

In summary, wireless device 12 can have at least one application or agent resident (either permanent or temporarily) on the computer platform 56 thereof which causes the gathering of event information 24 and corresponding location fix information 28 in order to determine an approximate geographic location of the wireless device at the time of occurrence of the detected event. Further, in some aspects, wireless device 12 may be operable to effect selective access to, and/or transmission of, data log 34 for that wireless device to another computer device (such as remote server 36) for analysis. For example, if the wireless device 12 is so embodied, data log 34 may be transmitted over an open communication connection from the wireless device 12 to the wireless network 32, such as an open voice or data call. If the wireless device is a cellular telephone 12 and the wireless network is a cellular telecommunication network, such as shown in FIG. 2, data log 34 can be transmitted through short message service or other wireless communication methods. Alternatively, if so embodied, the wireless device 12 may perform the analysis locally. In any case, an event position determination module 38 may execute predetermined position determination logic to determine the approximate geographic location 200 of the detected event based on the event information 24 and corresponding location fix information 28. In some aspects, the predetermined position determination logic may take into account the content and/or validity of all or a portion of the location fix information 28. Further, in some aspects, the predetermined position determination logic may determine the approximate geographic location 200 of the detected event based on at least one of one set of the location fix information 28 gathered prior to the time of the event, another set of the location fix information 28 gathered subsequent to the time of the event, and both sets of location fix information. Additionally, in some aspects, the predetermined position determination logic may be operable to generate an event report 44 providing a summary and/or details relating to the approximate geographic location 200 of the detected event, and which may further include all of some portion of one or both of the event information 24 and corresponding location fix information 28.

It should be noted that while the above-described event position determination module 38 utilizes one or more trigonometry-based predetermined relationships, any other type of mathematical expression may be utilized to determine an approximate geographic location 200 of the detected event 26 based on location fix information 26. Further, depending on the given scenario and the desired level of accuracy, such relationships may, may not, or may in part, incorporate the curvature of the earth.

In view of portions of the method being executable on computer platform 56 of a wireless device 12 and executed by processing engine 42 of remote server 36, the method includes a program resident in a computer readable medium, where the program directs a wireless device 12 having a device platform 56 to perform collection, storage and transmission acts of the method. Such a program can be executed on any single computer platform, or can be executed in a distributed way among several computer platforms. Furthermore, the method can be implemented by a program that directs a computer device such as remote server 36 to evaluate the validity of a geographic position in association with an event through gathering and processing data log 34 from the wireless device 12.

The computer readable medium may be the memory 78 of the computer platform 56 of the wireless device 12, or can be a data repository associated with remote server 36. Further, the computer readable medium can be in a secondary storage media that is loadable onto a wireless device computer platform or remote server, such as a magnetic disk or tape, optical disk, hard disk, flash memory, or other storage media as is known in the art.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the method may be implemented, for example, by operating portion(s) of the system, such as device platform 56 and remote server 36, to execute a sequence of machine-readable instructions. Such a sequence may include a plurality of sets of instructions, such as sets that correspond to the recited actions and/or steps of the disclosed methods. Further, the instructions can reside in various types of signal-bearing or data storage primary, secondary, or tertiary media. The media may comprise, for example, RAM (not shown) accessible by, or residing within, the components of the system. Whether contained in RAM, a diskette, or other secondary storage media, the instructions may be stored on a variety of machine-readable data storage media, such as DASD ("direct access storage device") storage (e.g., a conventional "hard drive" or a RAID ("redundant array of independent disks") array), magnetic tape, electronic read-only only memory (e.g., ROM, EPROM, or EEPROM), flash memory cards, an optical storage device (e.g. CD-ROM, WORM (write once, read many), DVD, digital optical tape), paper "punch" cards, or other suitable data storage media including digital and analog transmission media.

While the foregoing disclosure shows illustrative aspects, it should be noted that various changes and modifications could be made herein without departing from the scope of the described aspects as defined by the appended claims. Additionally, any aspects described herein may be used in combination with any other aspect described herein. Furthermore, although elements of the described aspects may be described or claimed in the singular, the plural is contemplated unless limitation to the singular is explicitly stated.

What is claimed is:

1. A method for approximating a geographic location corresponding to an operational event occurring on a wireless device, comprising:
    detecting the event occurring on the wireless device and a time the event occurred;
    obtaining at least one of a first set of location fix information corresponding to a first geographic position of the wireless device prior to the time of the event and/or a second set of location fix information corresponding to a second geographic position of the wireless device subsequent to the time of the event, wherein the at least one set of location fix information includes a time, horizontal location information, and horizontal velocity information; and
    calculating an approximate latitude and longitude of the wireless device location at the detected time that the event occurred on the wireless device based upon at least one predetermined relationship between the event time and the at least one set of location fix information, wherein calculating an approximate latitude and a longitude of the event further comprises determining a validity of at least one of the first set of location fix information and/or the second set of location fix information, wherein determining validity further comprises at least one of:
    determining that a time difference between the time of the event and a time of fix of at least one of the first set of location fix information and/or the second set of location fix information is less than or equal to a predetermined time threshold; and
    determining that a distance traveled by the wireless device between the time of the event and the time of fix of at least one of the first set of location fix information and/or second set of location fix information is less than or equal to a predetermined distance threshold.

2. The method according to claim 1, wherein calculating based on the at least one predetermined relationship further comprises determining the approximate latitude and longitude of the event based on the horizontal velocity information and a time difference between the event and the at least one set of fix information.

3. The method according to claim 1, wherein at least one of the first and/or second location fix information includes vertical location information and vertical velocity information, and further comprising calculating an approximate altitude of the event based on the at least one predetermined relationship using at least one of the vertical location information and/or the vertical velocity information.

4. The method according to claim 1, wherein calculating the approximate latitude and longitude of the event is based on the at least one predetermined relationship being between both of the first set of location fix information and the second set of location fix information, further comprising applying a predetermined weighting to each of the first set of location fix information and the second set of location fix information.

5. The method according to claim 1, further comprising transmitting an event tracking configuration to the wireless device from across a wireless network, wherein the event tracking configuration controls the retrieval of at least one of the first set of location fix information and/or the second set of location fix information.

6. The method according to claim 1, wherein the event corresponds to a predetermined operation of the wireless device.

7. The method according to claim 6, wherein the event corresponds to one or more predetermined configurable combinations of data associated with the operation of the wireless device.

8. The method according to claim 1, wherein calculating an approximate latitude and longitude of the event further comprises:
    determining that the first set of location fix information and the second set of location fix information are valid;
    determining that the first set of location fix information and the second set of location fix information comprise horizontal velocity information; and
    estimating a latitude coordinate and a longitude coordinate of the event, wherein the predetermined relationship is based on both of the first set of location fix information and the second set of location fix information.

9. The method according to claim 8, wherein estimating the latitude coordinate and longitude coordinate comprises:
calculating a first latitude ($AL_1\_lat$) using the formula:

$$AL_1\_lat = \arcsin[\sin(G_1\_lat)*\cos(Hd_1)+\cos(G_1\_lat)+\sin(Hd_1)*\cos(G_1\_\theta)];$$

calculating a first longitude ($AL_1\_lon$), using the formula:

$$AL_1\_lon = \mod(G_1\_lon-dlon_1+\pi,2*\pi)-\pi;$$

wherein $dLon_1$ is calculated as:

$$dLon_1 = \arctan 2([\sin(G_1\_\theta)*\sin(Hd_1)*\cos(G_1\_lat)],[\cos(Hd_1)-\sin(G_1\_lat)*\sin(AL_1\_lat)]);$$

calculating a second latitude ($AL_2\_lat$) using the formula:

$$AL_2\_lat = \arcsin[\sin(G_2\_lat)*\cos(Hd_2)+\cos(G_2\_lat)+\sin(Hd_2)*\cos(G_2\_\theta)];$$

calculating a second longitude ($AL_2\_lon$) using the formula:

$$AL_2\_lon = \mod(G_2\_lon-dLon_2+\pi,2*\pi)-\pi;$$

wherein $dLon_2$ is calculated as:

$$dLon_2 = \arctan 2([\sin(G_2\_\theta)*\sin(Hd_2)*\cos(G_2\_lat),[\cos(Hd_2)-\sin(G_2\_lat)*\sin(AL_2\_lat)]); \text{ and}$$

determining an estimated latitude (L_lat) and an estimated longitude (L_lon) according to the following:

if $|Hd_1|=|Hd_2|$, then $L\_Lat = AL_2\_lat;$ and $L\_Lon = AL_2\_lon;$ else $$L\_Lat = \left[\frac{(|HD_1|*AL_2\_lat)+(|HD_2|*AL_1\_lat)}{|HD_1|+|HD_2|}\right]; \text{ and}$$

$$L\_Lon = \left[\frac{(|HD_1|*AL_2\_lon)+(|HD_2|*AL_1\_lon)}{|HD_1|+|HD_2|}\right];$$

wherein:
  $G_1\_lat$ is a latitude corresponding to the first geographic position;
  $G_1\_lon$ is a longitude corresponding to the first geographic position;
  $Hd_1$ is a distance traveled based on a time difference between the time of the first geographic position and the time of the event;
  $G_1\_\theta$ is a bearing component of a horizontal velocity associated with the first geographic position;
  $G_2\_lat$ is a latitude coordinate associated with the second geographic position;
  $G_2\_lon$ is a longitude coordinate associated with the second geographic position;
  $Hd_2$ is a distance traveled based on a time difference between the time of the second geographic position and the time of the event; and
  $G_2\_\theta$ is a bearing component of a horizontal velocity associated with the second geographic position.

10. The method according to claim 8, wherein both the first and second set of location fix information comprise vertical velocity information, and further comprising calculating an altitude of the event using the vertical velocity information associated with both the first geographic position and the second geographic position.

11. The method according to claim 10, comprising: calculating a first vertical distance ($Vd_1$) using the formula:

$$Vd_1 = (G_1\_vv)*(Ets-G_1\_ts);$$

calculating a second vertical distance ($Vd_2$) using the formula:

$$Vd_2 = (G_2\_vv)*(Ets-G_2\_ts);$$

calculating a first altitude ($AL_1\_alt$) using the formula:

$$AL_1\_alt = G_1\_alt+Vd_1;$$

calculating a second altitude ($AL_1\_alt$) using the formula:

$$AL_2\_alt = G_2\_alt+Vd_2; \text{ and}$$

determining an extimated altitude (L_alt) of th event using the formula:

If $(|Vd_1|=|Vd_2|)$ then $L\_alt = AL_2\_alt;$ else $$L\_alt = \left[\frac{(|VD_1|*AL_2\_alt)+(|VD_2|*AL_1\_alt)}{|VD_1|+|VD_2|}\right]$$

wherein:
  Ets is the time of the event;
  $G_1\_alt$ is an altitude associated with the first geographic position;
  $G_1\_vv$ is a vertical velocity associated with the first geographic position;
  $G_1\_ts$ is a time associated with the first geographic position;
  $G_2\_alt$ is an altitude associated with the first geographic position;
  $G_2\_vv$ is a vertical velocity associated with the first geographic position; and
  $G_2\_ts$ is a time associated with the second geographic position.

12. The method according to claim 11, further comprising;
determining that the valid set of location fix information comprises altitude and vertical velocity information; and
calculating an altitude of the event using the valid set of location fix information.

13. The method according to claim 12, wherein calculating the estimated altitude comprises:
calculating a vertical distance (Vd) using the formula:

$$Vd = (G_n\_vv)*(Ets-G_n\_ts);$$

calculating a first approximate altitude (AL_alt) using the formula:

$$AL\_alt = G_n\_alt+Vd; \text{ and}$$

setting the estimated altitude (L_alt) using the formula:

$L\_alt = AL\_alt;$ wherein:
  Ets is the time of the event;
  $G_n\_alt$ is an altitude comprising the valid set of location fix information;
  $G_n\_vv$ is a vertical velocity comprising the valid set of location fix information; and
  $G_n\_ts$ is a time associated with the valid set of location fix information.

14. The method according to claim 1, wherein calculating an approximate latitude and longitude of the event further comprises:
   determining that only one of the first set and second set of location fix information is valid,
   determining that the valid set of location fix information comprises horizontal velocity information; and
   calculating an estimated latitude coordinate and an estimated longitude coordinate of the event wherein the predetermined relationship is based on the valid set of location fix information.

15. The method according to claim 14, wherein calculating an estimated latitude coordinate and an estimated longitude coordinate of the event further comprises:
   calculating a first approximate latitude (AL_lat) using the formula:

$$AL\_lat = \arcsin[\sin(G_n\_lat)*\cos(Hd) + \cos(G_n\_lat) + \sin(Hd)*\cos(G_n\_\theta)];$$

calculating a first longitude (AL_lon) using the formula:

$$AL\_lon = \mod(G\_lon - dlon + \pi, 2*\pi) - \pi;$$

wherein dLon is calculated as:

$$dLon = \arctan 2([\sin(G\_\theta)*\sin(Hd)\cos(G\_lat)], [\cos(Hd) - \sin(G\_lat)*\sin(AL\_lat)]);$$

setting an estimated latitude (L_lat) of the event and an estimated longitude (L_lon) of the event according to:

$$L\_Lat = AL\_lat; \text{ and}$$

$$L\_Lon = AL\_lon;$$

wherein:
      $G_n\_lat$ is a latitude coordinate associated with the valid set of location fix information;
      $G_n\_lon$ is a longitude coordinate associated with the valid set of location fix information;
      Hd is a distance traveled based on a time difference between the time of the valid set of location fix information and the time of the event; and
      $G_n\_\theta$ is a bearing component of a horizontal velocity associated with the valid set of location fix information.

16. An apparatus for approximating a geographic location corresponding to an operational event occurring on a wireless device, comprising:
   means for detecting the event occurring on the wireless device and a time the event occurred;
   means for obtaining at least one of a first set of location fix information corresponding to a first geographic position of the wireless device prior to the time of the event and/or a second set of location fix information corresponding to a second geographic position of the wireless device subsequent to the time of the event, wherein the at least one set of location fix information includes a time of fix, horizontal location information, and horizontal velocity information; and
   means for calculating an approximate latitude and a longitude of the wireless device at the detected time that the event occurred on the wireless device based upon at least one predetermined relationship between the event time and the at least one set of location fix information, wherein calculating an approximate latitude and a longitude of the event further comprises determining a validity of at least one of the first set of location fix information and/or the second set of location fix information, wherein determining validity further comprises at least one of:
      determining that a time difference between the time of the event and a time of fix of at least one of the first set of location fix information and/or the second set of location fix information is less than or equal to a predetermined time threshold; and
      determining that a distance traveled by the wireless device between the time of the event and the time of fix of at least one of the first set of location fix information and/or second set of location fix information is less than or equal to a predetermined distance threshold.

17. A computer-readable, non-transitory medium comprising instructions which, when executed by a computer, cause the computer to perform operations, the instructions including:
   instructions to detect an operational event occurring on a wireless device and a time of the event;
   instructions to obtain at least one of a first set of location fix information corresponding to a first geographic position of the wireless device prior to the time of the event and/or a second set of location fix information corresponding to a second geographic position of the wireless device subsequent to the time of the event, wherein the at least one set of location fix information includes a time, horizontal location information, and horizontal velocity information; and
   instructions to calculate an approximate latitude and longitude of the wireless device at the time of the event based upon at least one predetermined relationship between the time of the event and the at least one set of location fix information, wherein calculating an approximate latitude and a longitude of the event further comprises determining a validity of at least one of the first set of location fix information and/or the second set of location fix information, wherein determining validity further comprises at least one of:
      determining that a time difference between the time of the event and a time of fix of at least one of the first set of location fix information and/or the second set of location fix information is less than or equal to a predetermined time threshold; and
      determining that a distance traveled by the wireless device between the time of the event and the time of fix of at least one of the first set of location fix information and/or second set of location fix information is less than or equal to a predetermined distance threshold.

18. At least one processor configured to perform the actions of:
   detecting an operational event occurring on a wireless device and a time of the event;
   obtaining at least one of a first set of location fix information corresponding to a first geographic position of the wireless device prior to the time of the event and/or a second set of location fix information corresponding to a second geographic position of the wireless device subsequent to the time of the event, wherein the at least one set of location fix information includes a time, horizontal location information, and horizontal velocity information; and
   calculating an approximate latitude and longitude of the wireless device at the time that the operational event occurred based upon at least one predetermined relationship between the time of the event and the at least one set of location fix information, wherein calculating an approximate latitude and a longitude of the event further comprises determining a validity of at least one of the first set of location fix information and/or the second set of location fix information, wherein determining validity further comprises at least one of:
  determining that a time difference between the time of the event and a time of fix of at least one of the first set of location fix information and/or the second set of location fix information is less than or equal to a predetermined time threshold; and
  determining that a distance traveled by the wireless device between the time of the event and the time of fix of at least one of the first set of location fix information and/or second set of location fix information is less than or equal to a predetermined distance threshold.

19. An apparatus for approximating a geographic location corresponding to an operational event occurring on a wireless device, comprising:
  an event position determination module operable to detect the event occurring on the wireless device and the time of the event, and obtain at least one of a first set of location fix information corresponding to a first geographic position of the wireless device prior to the time of the event and/or a second set of location fix information corresponding to a second geographic position of the wireless device subsequent to the time of the event, wherein the at least one set of location fix information comprises a time, horizontal location information, and horizontal velocity information; and
  wherein the event position determination module is operable to calculate an approximate latitude and longitude of the wireless device at the time of the event based upon at least one predetermined relationship between the time of the event and the at least one set of location fix information, wherein calculating an approximate latitude and a longitude of the event further comprises determining a validity of at least one of the first set of location fix information and/or the second set of location fix information, wherein determining validity further comprises at least one of:
  determining that a time difference between the time of the event and a time of fix of at least one of the first set of location fix information and/or the second set of location fix information is less than or equal to a predetermined time threshold; and
  determining that a distance traveled by the wireless device between the time of the event and the time of fix of at least one of the first set of location fix information and/or second set of location fix information is less than or equal to a predetermined distance threshold.

20. The apparatus according to claim 19, wherein the at least one of the set of location fix information further comprises vertical velocity information, and wherein the event position determination module is further operable to determine an estimated altitude of the event based upon the vertical velocity information.

21. The apparatus according to claim 19, wherein at least one of the first set of location fix information and/or the second set of location information is generated based on a detection of a predetermined event on the wireless device.

22. The apparatus according to claim 19, wherein the event position determination module is further operable to transmit an event tracking configuration across a wireless network to the wireless device, wherein the event tracking configuration is executable by the wireless device to generate at least one of the first set of location fix information and/or the second set of location information.

23. The apparatus according to claim 19, wherein the event corresponds to a predetermined operation of the wireless device.

24. The apparatus according to claim 19, wherein the event corresponds to one or more predetermined configurable combinations of data associated with an operation of the wireless device.

25. The apparatus according to claim 19, wherein the at least one predetermined relationship is operable to determine the approximate geographic location of the event based on the horizontal velocity information and a time difference between the event and the at least one set of fix information.

26. A method for tracking information relating to an event occurring on a wireless device, comprising:
  detecting an occurrence of an operational event on the wireless device and a time of the event, wherein the event is defined by an event tracking configuration;
  storing event information relating to the detected occurrence of the defined event;
  generating a position determination request based on the detected occurrence of the defined event;
  storing a first set of location fix information prior to the occurrence of the defined event and a second set of location fix information subsequent to the occurrence of the defined event, wherein the second set of location fix information is based on the position determination request, and wherein at least one of the first and/or second set of location fix information comprises a geographic location and a horizontal velocity of the wireless device operable to be utilized in a predetermined relationship with the event information to determine an approximate geographic location of the wireless device at the time of the the event; and
  calculating an approximate latitude and longitude of the wireless device at the time of the event occurrence based upon at least one predetermined relationship between the time of the event occurrence and the at least one set of location fix information, wherein calculating an approximate latitude and a longitude of the event further comprises determining a validity of at least one of the first set of location fix information and/or the second set of location fix information, wherein determining validity further comprises at least one of:
  determining that a time difference between the time of the event occurrence and a time of fix of at least one of the first set of location fix information and/or the second set of location fix information is less than or equal to a predetermined time threshold; and
  determining that a distance traveled by the wireless device between the time of the event occurrence and the time of fix of at least one of the first set of location fix information and/or second set of location fix information is less than or equal to a predetermined distance threshold.

27. The method of claim 26, wherein at least one of the location fix information further comprises vertical velocity information operable to be utilized in the predetermined relationship to determine an altitude component of the approximate geographic location.

28. The method of claim 26, wherein at least one of the location fix information further comprises horizontal bearing operable to be utilized in the predetermined relationship to determine the approximate geographic location.

29. The method of claim 26, further comprising transmitting the event information and the location fix information across a wireless network to another device for determining the approximate geographic location.

30. At least one processor configured to perform the actions of:
  detecting an occurrence of an operational event on the wireless device and a time of the event, wherein the event is defined by an event tracking configuration;
  storing event information relating to the detected occurrence of the defined event;
  generating a position determination request based on the detected occurrence of the defined event;
  storing a first set of location fix information prior to the occurrence of the defined event and a second set of location fix information subsequent to the occurrence of the defined event, wherein the second set of location fix information is based on the position determination request, and wherein at least one of the first and/or second set of location fix information comprises a geographic location and a horizontal velocity of the wireless device operable to be utilized in a predetermined relationship with the event information to determine an approximate geographic location of the wireless device at the time of the event; and
  calculating an approximate latitude and longitude of the wireless device at the time of the event based upon at least one predetermined relationship between the time of the event and the first set of location fix information and/or the second set of location fix information, wherein calculating an approximate latitude and a longitude of the event further comprises determining a validity of at least one of the first set of location fix information and/or the second set of location fix information, wherein determining validity further comprises at least one of:
  determining that a time difference between the time of the event and a time of fix of at least one of the first set of location fix information and/or the second set of location fix information is less than or equal to a predetermined time threshold; and
  determining that a distance traveled by the wireless device between the time of the event and the time of fix of at least one of the first set of location fix information and/or second set of location fix information is less than or equal to a predetermined distance threshold.

31. A computer-readable, non-transitory medium comprising instructions which, when executed by a machine, cause the machine to perform operations, the instructions including:
  instructions to detect an occurrence of an operational event on the wireless device and a time of the event, wherein the event is defined by an event tracking configuration;
  instructions to store event information relating to the detected occurrence of the defined event;
  instructions to generate a position determination request based on the detected occurrence of the defined event; and
  instructions to store a first set of location fix information prior to the occurrence of the defined event and a second set of location fix information subsequent to the occurrence of the defined event, wherein the second set of location fix information is based on the position determination request, and wherein at least one of the first and/or second set of location fix information comprises a geographic location and a horizontal velocity of the wireless device operable to be utilized in a predetermined relationship with the event information to determine an approximate geographic location of the wireless device at the detected time of the event; and
  instructions to calculate an approximate latitude and longitude of the wireless device at the time of the event based upon at least one predetermined relationship between the time of the event and the first set of location fix information and/or the second set of location fix information, wherein calculating an approximate latitude and a longitude of the event further comprises determining a validity of at least one of the first set of location fix information and/or the second set of location fix information, wherein determining validity further comprises at least one of:
  determining that a time difference between the time of the event and a time of fix of at least one of the first set of location fix information and/or the second set of location fix information is less than or equal to a predetermined time threshold; and
  determining that a distance traveled by the wireless device between the time of the event and the time of fix of at least one of the first set of location fix information and/or second set of location fix information is less than or equal to a predetermined distance threshold.

32. A wireless device for tracking information relating to an event occurring on the wireless device, comprising:
  means for detecting an occurrence of an operational event on the wireless device and a time of the event, wherein the event is defined by an event tracking configuration;
  means for storing event information relating to the detected occurrence of the defined event;
  means for generating a position determination request based on the detected occurrence of the defined event; and
  means for storing a first set of location fix information prior to the occurrence of the defined event and a second set of location fix information subsequent to the occurrence of the defined event, wherein the second set of location fix information is based on the position determination request, and wherein at least one of the first and/or second set of location fix information comprises a geographic location and a horizontal velocity of the wireless device operable to be utilized in a predetermined relationship with the event information to determine an approximate geographic location of the wireless device at the detected time of the occurrence of the defined event; and
  means for calculating an approximate latitude and longitude of the wireless device at the time of the event based upon at least one predetermined relationship between the time of the event and the first set of location fix information and/or the second set of location fix information, wherein calculating an approximate latitude and a longitude of the event further comprises determining a validity of at least one of the first set of location fix information and/or the second set of location fix information, wherein determining validity further comprises at least one of:
  determining that a time difference between the time of the event and a time of fix of at least one of the first set of location fix information and/or the second set of location fix information is less than or equal to a predetermined time threshold; and
  determining that a distance traveled by the wireless device between the time of the event and the time of fix of at least one of the first set of location fix information and/or second set of location fix information is less than or equal to a predetermined distance threshold.

33. A wireless device, comprising:
a computer platform comprising a plurality of detected event data relating to an operation of the wireless device;
an event tracking module in communication with the computer platform and having the event tracking module define one of the plurality of events to track, the event tracking module further comprising event tracking logic operable to initiate storage of event information and further operable to generate a position determination request upon detecting the defined one of the plurality of events; and
a memory operable to store the event information and location fix information, wherein the location fix information comprises a first set of location fix information prior to the occurrence of the defined event and a second set of location fix information subsequent to the occurrence of the defined event, wherein the second set of location fix information is based on the position determination request, and wherein at least one of the first and/or second set of location fix information comprises geographic location information and horizontal velocity information operable, based on a predetermined relationship with the event information, for determining an approximate geographic location of the wireless device at a time of the event;
wherein the event tracking module is further operable to calculate an approximate latitude and longitude of the wireless device at the time of the event based upon at least one predetermined relationship between the time of the event and the first set of location fix information and/or the second set of location fix information, wherein calculating an approximate latitude and a longitude of the event further comprises determining a validity of at least one of the first set of location fix information and/or the second set of location fix information, wherein determining validity further comprises at least one of:
determining that a time difference between the time of the event and a time of fix of at least one of the first set of location fix information and/or the second set of location fix information is less than or equal to a predetermined time threshold; and
determining that a distance traveled by the wireless device between the time of the event and the time of fix of at least one of the first set of location fix information and/or second set of location fix information is less than or equal to a predetermined distance threshold.

34. The wireless device of claim 33, wherein the event information comprises an event time, and wherein the location fix information further comprises at least one of a location fix time, a horizontal bearing, a horizontal velocity, a vertical velocity and/or an altitude.

35. The wireless device of claim 33, further comprising a location module in communication with the computer platform and executable upon receipt of the position determination request to initiate retrieval of the second set of location fix information.

* * * * *